United States Patent
Kuchenbecker et al.

(10) Patent No.: US 10,509,468 B2
(45) Date of Patent: Dec. 17, 2019

(54) PROVIDING FINGERTIP TACTILE FEEDBACK FROM VIRTUAL OBJECTS

(71) Applicant: Tactai, Inc., Waltham, MA (US)

(72) Inventors: Katherine J. Kuchenbecker, Stuttgart (DE); Steven D. Domenikos, Millis, MA (US); Jean-Samuel Chenard, Saint-Bruno (CA); Ilann Derche, Rosemere (CA)

(73) Assignee: TACTAI, INC., Waltham, WA (US)

( * ) Notice: Subject to any disclaimer, the term of this patent is extended or adjusted under 35 U.S.C. 154(b) by 0 days.

(21) Appl. No.: 15/416,005

(22) Filed: Jan. 26, 2017

(65) Prior Publication Data

US 2017/0212589 A1 Jul. 27, 2017

Related U.S. Application Data

(60) Provisional application No. 62/287,506, filed on Jan. 27, 2016.

(51) Int. Cl.
*G06F 3/01* (2006.01)
*G06F 3/0346* (2013.01)

(52) U.S. Cl.
CPC .............. *G06F 3/014* (2013.01); *G06F 3/016* (2013.01); *G06F 3/0346* (2013.01); *G06F 2203/0331* (2013.01)

(58) Field of Classification Search
None
See application file for complete search history.

(56) References Cited

U.S. PATENT DOCUMENTS

| | | |
|---|---|---|
| 5,742,278 A | 4/1998 | Chen et al. |
| 6,131,097 A | 10/2000 | Peurach et al. |
| 6,275,213 B1 | 8/2001 | Tremblay et al. |
| 6,924,787 B2 | 8/2005 | Kramer et al. |
| 7,050,955 B1 | 5/2006 | Carmel et al. |
| 7,084,884 B1 | 8/2006 | Nelson et al. |
| 7,196,688 B2 | 3/2007 | Schena |
| 7,742,036 B2 | 6/2010 | Grant et al. |
| 7,791,588 B2 | 9/2010 | Tierling et al. |
| 8,174,372 B2 | 5/2012 | da Costa |
| 8,352,643 B2 | 1/2013 | Birnbaum et al. |

(Continued)

OTHER PUBLICATIONS

"LinkTouch: a Wearable Haptic Device with Five-Bar Linkage Mechanism for Presentation of Two-DOF Force Feedback at the Finger Pad", Tsetserukou et al., IEEE Haptics Symposium 2014, Feb. 23-26, 2014, pp. 307-312 (Year: 2014).*

(Continued)

*Primary Examiner* — Brian M Butcher
(74) *Attorney, Agent, or Firm* — Hoffman Warnick LLC

(57) ABSTRACT

Various systems, methods and computer program products are disclosed which provide fingertip tactile feedback from virtual objects. In various embodiments, a wearable haptic thimble is disclosed. The wearable haptic thimble is configured for use with a virtual reality (or augmented reality) system, and may include: an attachment mechanism for engaging a finger of a user; and at least one contact pad coupled with the attachment mechanism, the at least one contact pad configured to deliver tactile sensations to the finger of the user to provide a tactile representation of virtual reality (or augmented reality) in the virtual reality (or augmented reality) system.

20 Claims, 15 Drawing Sheets

(56) References Cited

U.S. PATENT DOCUMENTS

| | | |
|---|---|---|
| 8,362,882 B2 | 1/2013 | Heubel et al. |
| 8,405,612 B2 | 3/2013 | Kruse et al. |
| 8,576,253 B2 | 11/2013 | Wilson |
| 9,213,408 B2 | 12/2015 | Gandhi et al. |
| 2014/0104274 A1 | 4/2014 | Hilliges et al. |
| 2015/0358543 A1* | 12/2015 | Kord ............... G06F 3/011 345/474 |
| 2016/0054797 A1* | 2/2016 | Tokubo ............ G06F 3/012 345/633 |
| 2016/0105493 A1 | 4/2016 | Bacher et al. |
| 2016/0179198 A1 | 6/2016 | Levesque et al. |

OTHER PUBLICATIONS

"On Utilizing Psuedo-Haptics for Cutaneous Fingertip Haptic Device", Jang et al., IEEE Haptics Symposium 2014, Feb. 23-26, 2014, pp. 635-639 (Year: 2014).*

"HapThimble: A wearable Haptic Device towards Usable Virtual Touch Screen", Kim et al., CHI 2016, May 7-12, 2016, p. 3694-3705 (Year: 2016).*

* cited by examiner

US 10,509,468 B2

PROVIDING FINGERTIP TACTILE FEEDBACK FROM VIRTUAL OBJECTS

CROSS-REFERENCE TO RELATED APPLICATION

This application claims priority to U.S. Provisional Patent Application No. 62/287,506, filed on Jan. 27, 2016, which is hereby incorporated by reference in its entirety.

FIELD

Various aspects of the disclosure relate to virtual reality. Specific aspects are disclosed to provide a human user with fingertip tactile feedback from virtual objects in an environment, whether that environment is fully immersive or contains only certain computer-generated virtual elements. Names given to these environments include, but are not limited to, virtual reality, mixed reality, merged reality, and augmented reality (collectively referred to herein as "virtual reality" or "VR").

BACKGROUND

Most current virtual reality systems rely on the use of either two-handed game controllers or combinations of large single-hand input devices to enable a human user to interact with virtual environments and objects. These devices provide functional input and a means for interaction in virtual reality. However, they tend to be cumbersome and unnatural for users. Furthermore, these existing input systems fail to accurately reproduce the true sensory interactions that naturally occur between humans and objects. This is in part due to their omission of the tactile properties of objects. Some non-controller-based virtual reality input systems use hand tracking to reproduce natural hand movement in a virtual environment, but they also lack tactile feedback. As such, simple tasks such as following a contour or grasping an object are difficult without significant practice.

SUMMARY

Various systems, methods and computer program products are disclosed which provide a human user with fingertip tactile feedback from virtual objects. A wearable haptic thimble is disclosed in various embodiments. The wearable haptic thimble is configured for use with a virtual reality system.

A first aspect of the disclosure includes a wearable haptic thimble for use with a virtual reality system, the thimble including: an attachment mechanism for engaging a finger of a user; and at least one contact pad coupled with the attachment mechanism, the at least one contact pad configured to interact with (and move relative to) the finger of the user to provide a tactile representation of virtual reality in the virtual reality system.

A second aspect of the disclosure includes a wearable haptic thimble for use with an augmented reality system, comprising: an attachment mechanism for engaging a finger of a user; and at least one contact pad coupled with the attachment mechanism, the at least one contact pad configured to interact with (and move relative to) the finger of the user to provide a tactile representation of augmented reality in the augmented reality system.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
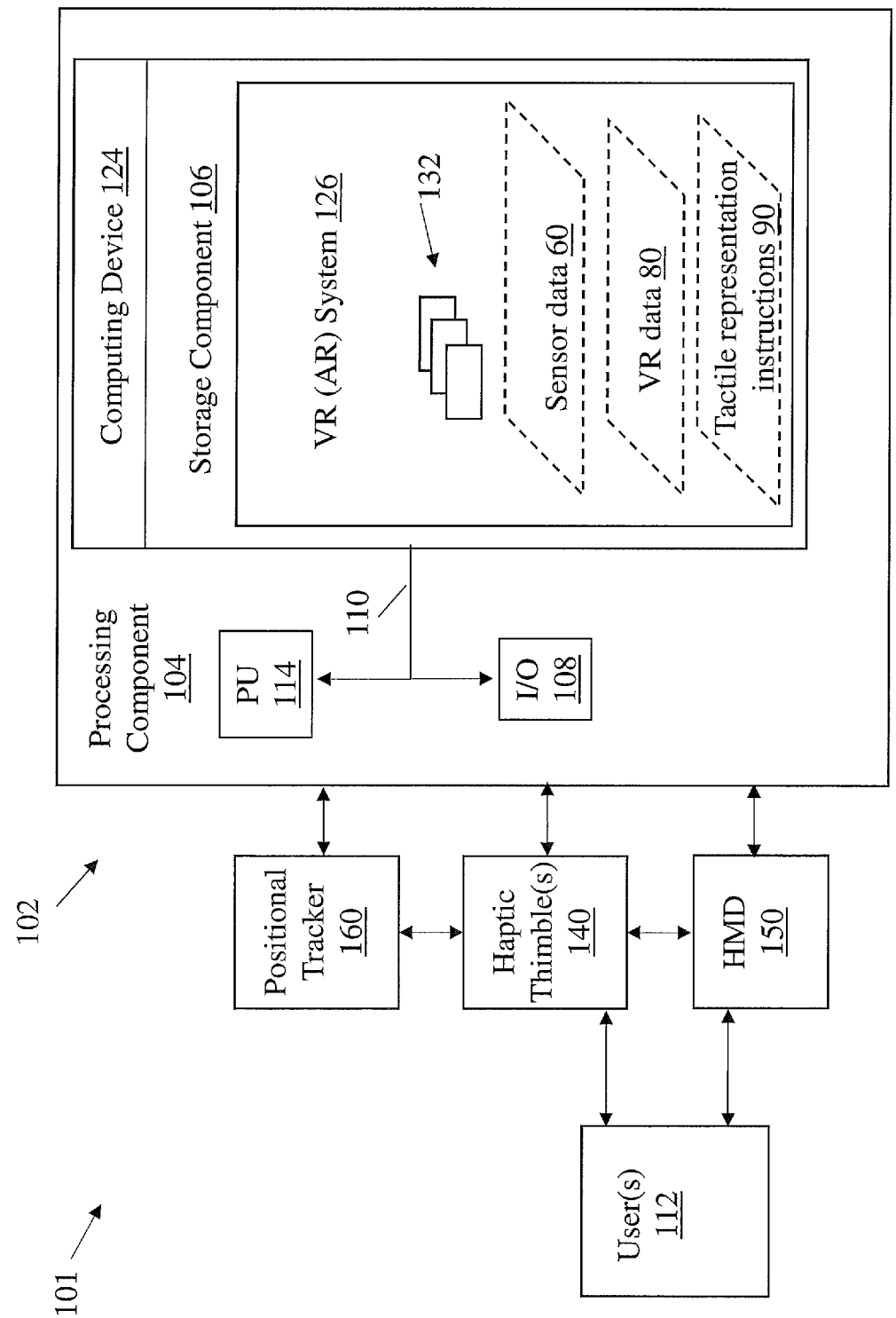
FIG. 1 shows an illustrative environment including a system according to various embodiments of the disclosure.

It is noted that the drawings of the various aspects of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Virtual reality allows a human user to view three-dimensional virtual objects through a head-mounted display (HMD). The HMD tracks the user's head motion and continually updates the visual input relative to the head position, effectively replicating normal vision. Although the visual illusion is compelling, in conventional systems, the user cannot physically interact with objects within this virtual environment, significantly limiting the realism and interactivity.

Various embodiments of the disclosure include systems and methods that enable a user to touch virtual objects and feel realistic tactile sensations on the fingertip, through a compact wearable device. This device (or thimble) thereby brings the sense of touch into virtual reality.

In the following description, reference is made to the accompanying drawings that form a part thereof, and in which is shown by way of illustration, specific example embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely illustrative.

Various aspects of the disclosure include a thimble including a platform that can move in and out of contact with the finger (e.g., at the finger pad) and apply varying amounts of force on the finger of a user. This platform can also vibrate at a broad range of frequencies and amplitudes. The resulting output is the combination of several distinct waveforms produced by the actuation mechanism(s) connected to and embedded in the moving platform. The convergence of these individual waveforms in space and time generate an actuation wave that replicates convincing tactile sensations to the human user when his or her finger contacts a virtual object.

In various embodiments, the finger of the human user is held in a stationary position within the device, and the platform moves to contact the finger and provide a tactile representation of the virtual object. In some cases, the finger is restrained at or proximate to the minor knuckle, to prevent movement of the last (third) phalange relative to the second-to-last (second) phalange of the finger.

In some cases, the device can be configured to provide contact with the finger pad portion of the finger. That is, the platform can include one or more segments, or individual platforms, for contacting the finger pad portion of the finger. As used herein, the terms "fingertip," "finger pad" and "finger pad portion" can refer to one or more surfaces of the finger in the third phalange (e.g., beyond the minor knuckle), exclusive of the fingernail.

The platform contact surface or the surrounding support structure can optionally include a thermal feedback component. The platform moves relative to the body of a thimble that is securely and comfortably attached to the distal parts (e.g., proximate minor knuckle) of one of the user's fingers, e.g., the index finger. A motion tracking system can continually measure the position and orientation of the thimble and send this information to the computer that is generating the visual output projected through the head mounted display (HMD).

In various embodiments, the user's finger can be graphically depicted in a visual output projected through the HMD, and the computing device can continually compare the finger's location in relation to the virtual components of the virtual environment. As described herein, the computing device is configured to initiate movement of the platform contact surface when the position of the user's finger indicates its corresponding virtual representation is contacting or nearly contacting a surface of a virtual object. It is understood that some characteristics, such as temperature, will be triggered prior to the virtual representation of the finger contacting the surface of the virtual object.

Each component of the virtual environment can be endowed with haptic object properties (HOPs) stored in the computing device, or the system can estimate appropriate HOPs from the visual appearance of a surface. When contact between the virtual representation of the finger and the virtual surface takes place, the computer system sends relevant interaction parameters to the processor that controls the thimble's platform movement and object property output (e.g., vibration to simulate texture, change in platform temperature). The thimble's processor uses this information to continually calculate appropriate commands for the device's actuator(s) so that the user feels sensations that create a convincing perception of softness, shape, texture, material properties and/or temperature of the virtual object, along with other tactile properties.

In various embodiments, a user can wear one or more thimbles as described herein to provide tactile feedback within a virtual reality environment. That is, a user could use one, two, three, etc., thimble(s) to enhance interaction with the virtual reality environment. For example, a user could wear a haptic thimble as disclosed herein on each pointer finger, a combination of each pointer finger and each thumb, or all fingers on one or both hands.

FIG. 1 shows an illustrative environment 101 including a haptic virtual reality (VR)/augmented reality (AR) system (referred to as VR system) 126, for performing the functions described herein according to various embodiments of the invention. To this extent, the environment 101 includes a computer system 102 that can perform one or more processes described herein in order to allow for one or more user(s) 112 to participate in haptic VR functions described herein. In particular, the computer system 102 is shown as including the haptic VR system 126, which makes computer system 102 operable to allow for one or more user(s) 112 to participate in haptic VR functions by performing any/all of the processes described herein and implementing any/all of the embodiments described herein.

The computer system 102 is shown including a computing device 124, which can include a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the haptic VR system 126, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable user(s) (e.g., a human and/or computerized user) 112 to interact with the computer system 102 and/or one or more communications devices to enable the system user(s) 112 to communicate with the computer system 102 using any type of communications link. To this extent, the haptic VR system 126 can manage a set of interfaces (e.g., graphical user interface(s), application program interface) that enable human and/or system users(s) 112 to interact with the haptic VR system 126. Further, the haptic VR system 126 can manage (e.g., store, retrieve, create, manipulate, organize, present) data, such as sensor data 60 and/or VR data 80 using any solution. In some cases, environment further includes one or more haptic thimbles 140, and a head-mounted display (HMD) 150 and a positional tracker 160, each coupled with computing device 102 (e.g., via conventional hard-wired and/or wireless means), which may also be coupled with one another. User 112 can interact with haptic thimble(s) 140 and HMD 150 to experience various scenarios enabled by haptic VR system 126. As described herein, haptic thimble(s) 140 can include one or more sensors (e.g., magnetic, inertial, optical) and actuators (e.g., vibrational, electromagnetic, piezoelectric) for creating a tactile response to a virtual object or environment, while HMD 150 can further include one or more sensors and actuators for informing that tactile response at haptic thimble(s) 140. One or more positional tracker(s) 160 can be used independently or as a complement of the on-board sensors of haptic thimble(s) 140 and/or HMD 150 to allow VR system 126 to compute position and orientation of the haptic thimble 140 in relation to the user 112. In various embodiments, one or more positional tracker(s) 160 can be located within haptic thimble(s) 140 and/or HMD 150 to provide information about the position of one or more of these devices (and user 112), which may be transmitted/stored/manipulated as sensor data 60.

In any event, the computer system 102 can comprise one or more general purpose computing articles of manufacture (e.g., computing devices) capable of executing program code, such as the haptic VR system 126, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the haptic VR system 126 can be embodied as any combination of system software and/or application software.

It is further understood that the haptic VR system 126 can be implemented in a cloud-based computing environment, where one or more processes are performed at distinct computing devices (e.g., a plurality of computing devices 124), where one or more of those distinct computing devices may contain only some of the components shown and described with respect to the computing device 124 of FIG. 1.

Further, the haptic VR system 126 can be implemented using a set of modules 132. In this case, a module 132 can enable the computer system 102 to perform a set of tasks used by the haptic VR system 126, and can be separately developed and/or implemented apart from other portions of the haptic VR system 126. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of haptic VR system 126 fixed thereon (e.g., one or more modules 132). However, it is understood that the computer system 102 and haptic VR system 126 are only representative of various possible equivalent computer systems that may perform a process described herein. To this extent, in other embodiments, the functionality provided by the computer system 102 and haptic VR system 126 can be at least partially implemented by one or more computing devices that include any combination of general- and/or specific-purpose hardware with or without program code. In each embodiment, the hardware and program code, if included, can be created using standard engineering and programming techniques, respectively.

Regardless, when the computer system 102 includes multiple computing devices 124, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as sensor data 60 and/or VR data 80 using any solution. The computer system 102 can generate sensor data 60 and/or VR data 80, from one or more data stores, receive sensor data 60 and/or VR data 80, from another system, send sensor data 60 and/or VR data 80 to another system, etc. As described herein, sensor data 60 can include data from one or more sensors connected with the haptic VR system 126, e.g., data from an interface, optical sensor, motion sensor, etc., which could indicate movement of the user's body (e.g., finger) and/or contact, compression, etc. with one or more of the sensors. VR data 80 can include information about one or more aspects of the VR environment, e.g., objects, spatial relationships, characteristics of the environment. These aspects can include softness, hardness, temperature, elasticity, etc. of objects, or physical conditions of the environment such as wetness, wind velocity, etc.

While shown and described herein as a method and system for providing a haptic VR system, it is understood that aspects of the invention further provide various alternative embodiments. For example, in one embodiment, the invention provides a computer program fixed in at least one computer-readable medium, which when executed, enables a computer system to provide a haptic VR system. To this extent, the computer-readable medium includes program code, such as the haptic VR system 126 (FIG. 1), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the disclosure provides a method of providing a copy of program code, such as the haptic VR system 126 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of providing a haptic VR system. In this case, a computer system, such as the computer system 102 (FIG. 1), can be obtained (e.g., created, maintained, made available) and one or more components for performing a process described herein can be obtained (e.g., created, purchased, used, modified) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, the technical effect of the various embodiments of the invention, including, e.g., the haptic VR system 126, is to allow users to experience a haptic interaction with a VR environment as described herein.

Figure 2:
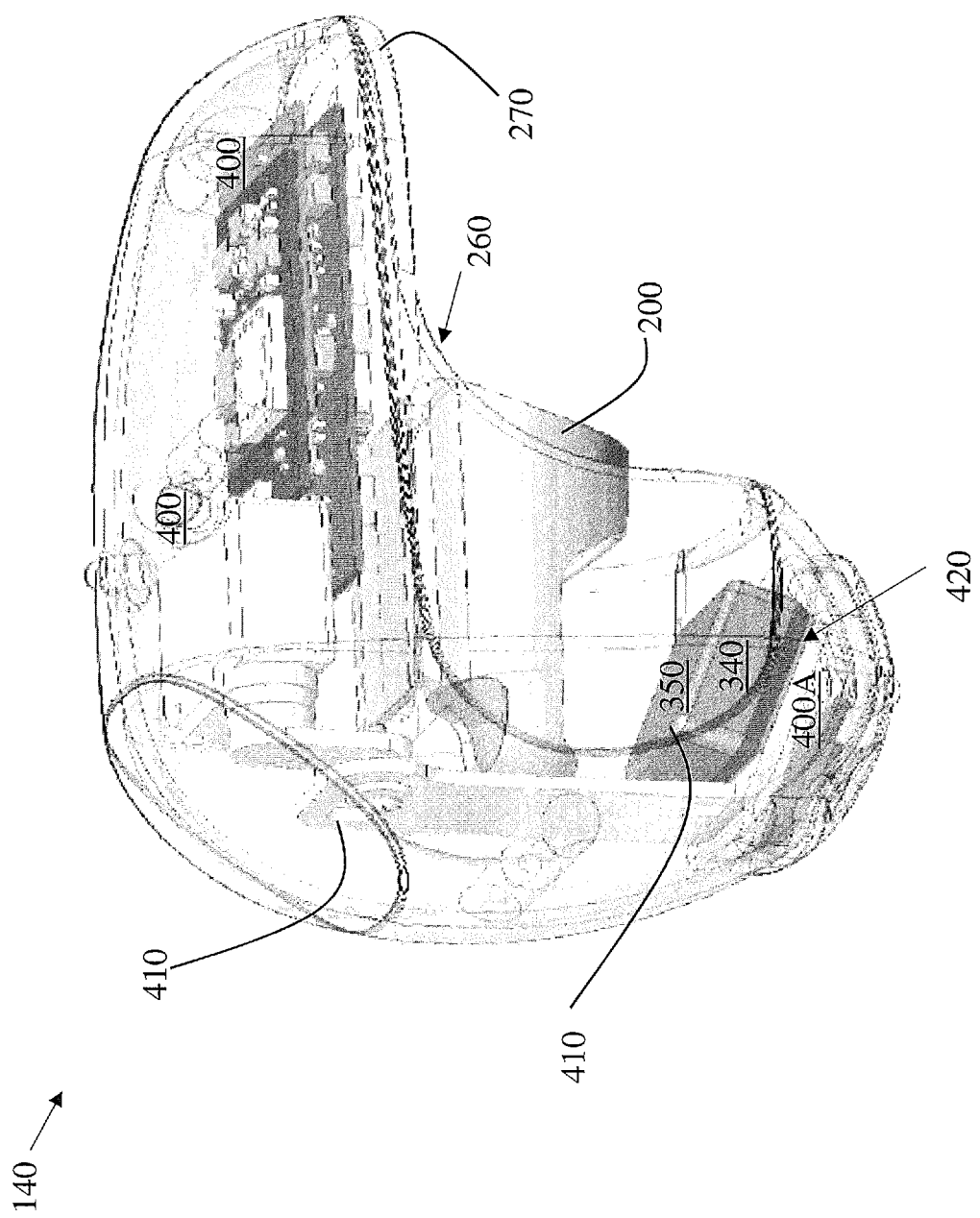
FIG. 2 shows a schematic depiction of a haptic thimble according to various embodiments of the disclosure.

FIG. 2 shows a schematic three-dimensional view of the wearable haptic thimble 140 for use with VR system 126 according to various embodiments of the disclosure. The wearable haptic thimble (or simply, "thimble") 140 is shown in a partially transparent depiction to illustrate various aspects of the component. Additional embodiments of thimbles 1000, 1100, 1200, 1300, 1400, 1500 are shown in FIGS. 9-15, and it is understood that components of any of thimbles 140, 1000, 1100, 1200, 1300, 1400, 1500 can be used interchangeably for like components in other embodiments of thimbles 140, 1000, 1100, 1200, 1300, 1400, 1500. It is understood that components similarly described in different embodiments of the thimbles disclosed herein can act similarly in other embodiments of thimbles.

Figure 3:
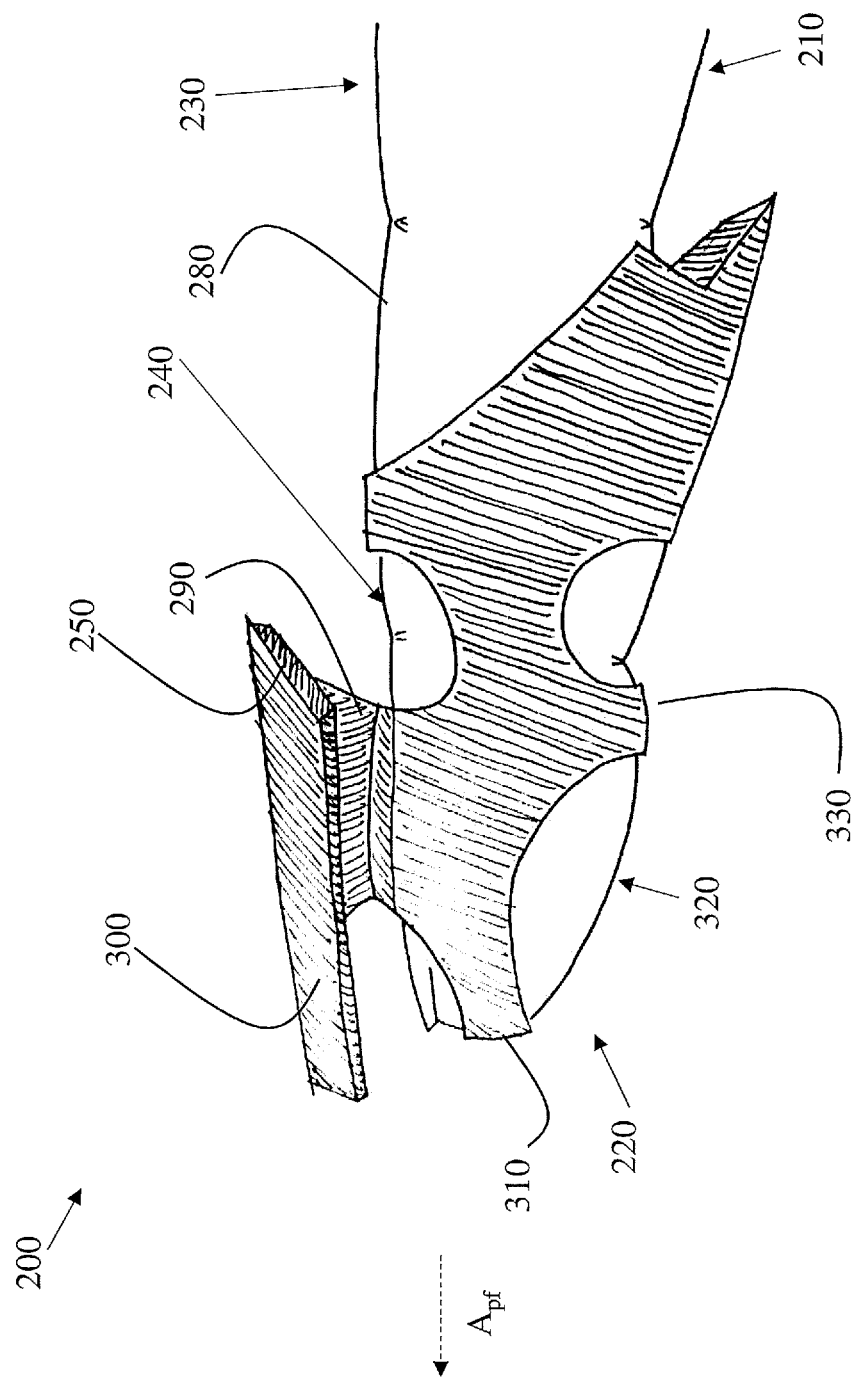
FIG. 3 shows a schematic depiction of an attachment mechanism on a finger of a user according to various embodiments of the disclosure.
Figure 4:
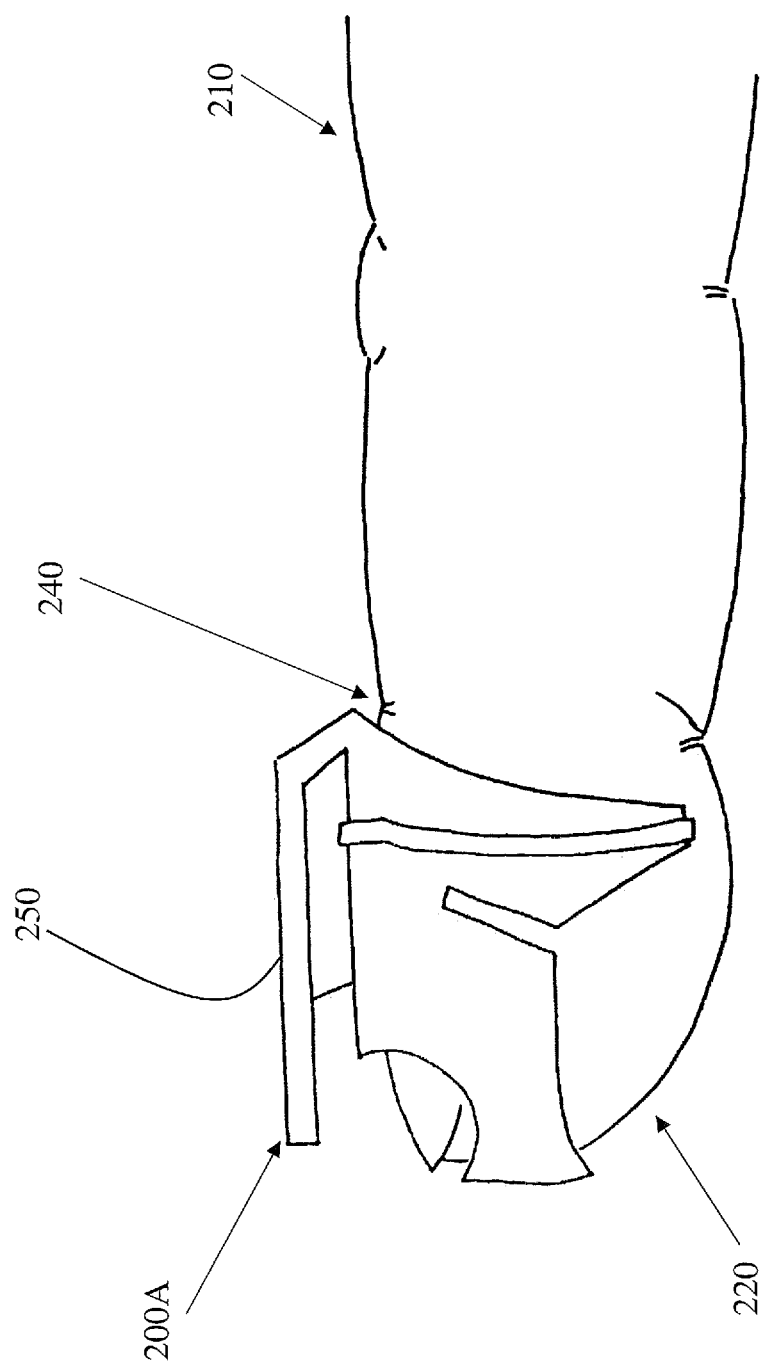
FIG. 4 shows an additional view of an embodiment of an attachment mechanism.
Figure 5:
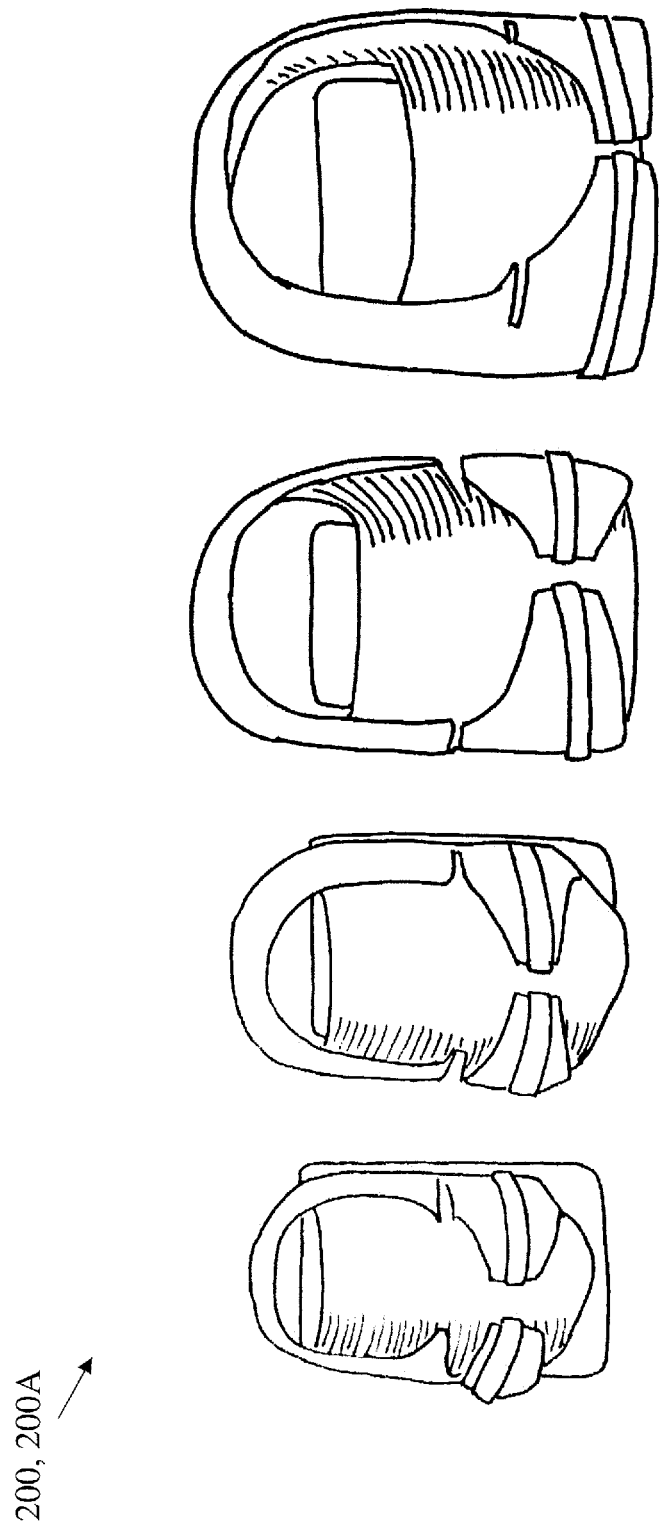
FIG. 5 shows various sizes of attachment mechanisms according to embodiments of the disclosure.

Returning to FIG. 2, according to various embodiments, thimble 140 can include an attachment mechanism 200 for engaging a finger of user 112 (FIG. 1). FIG. 3 shows a close-up schematic depiction of attachment mechanism 200 engaged with (e.g., at least partially surrounding, or substantially surrounding) a portion of a finger 210 of user 112 (FIG. 1). In some cases, attachment mechanism 200 engages a tip 220 of finger 210 and spans from tip 220 of finger 210 to a location below the major knuckle 230 (as measured from the base of finger 210). That is, attachment mechanism 200 can be configured to contact finger 210 at the second and third (last) phalange of finger 210 and span across minor knuckle 240 of finger 210. In some cases, attachment mechanism 200 is formed of a material such as a hard plastic, polymer, metal, carbon fiber, rubber, etc. In some cases, attachment mechanism 200 is sized to rest on finger 210 of user 112 (e.g., on tip 220), such that the user 112 can flex his/her finger 210 at major knuckle 230 or minor knuckle 240 without displacing attachment mechanism 200. FIG. 4 shows a close-up perspective view of another embodiment of an attachment mechanism 200A, which is sized to fit over tip 220 of finger 210 and terminate approximately at or before the minor knuckle 240. That is, in this embodiment, attachment mechanism 200A contacts the third (last) phalange of finger 210. FIG. 5 shows various sizes of attachment mechanism 200, 200A, which may have distinct inner diameters and lengths to accommodate fingers 210 of varying sizes (e.g., varying across users 112, or within users 112, such as for pointer finger, thumb, pinkie finger, etc.). FIGS. 3 and 4 demonstrate an embodiment where attachment mechanism 200 includes a tab 250 sized to engage a slot 260 (FIG. 2) in the housing 270 of thimble 140. In some cases, this tab 250 is positioned on nail-side 280 of finger 210 such that attachment mechanism 200 helps to suspend finger 210 within housing 270 of thimble 140 (FIG. 2). Tab 250 can include a first protrusion 290 with a first thickness (e.g., measured across the primary axis ($A_{pf}$) of finger 210 and a second protrusion 300 extending from first protrusion 290 with a second, greater thickness as measured across primary axis $A_{pf}$). Second protrusion 300 can be sized to engage slot 260 in housing 270, e.g., to substantially fill slot 260. Attachment mechanism 200 can further include a sleeve 310 coupled with the tab 250, where sleeve 310 includes at least one opening 320 permitting access to the tip of the finger 210 (e.g., sized to be slightly larger than the tip of finger 210), and at least one retaining member 330 for maintaining a position of the portion of the finger 210 (e.g., minor knuckle 240 area) within sleeve 310 relative to tab 250.

Returning to FIG. 2, thimble 140 can further include at least one contact pad 340 within housing 270, thereby coupled with attachment mechanism 200. Contact pad 340 is configured to interact with finger 210 of user 112 (e.g., at a surface 350) to provide a tactile representation of virtual reality, e.g., an object in VR system 126. Contact pad 340 is configured to move relative to the stationary portion of finger 210 retained within sleeve 310, and contact the tip 220 of finger 210 to provide the tactile representation of virtual reality. Various embodiments of the disclosure demonstrate a thimble 140 with a single contact pad 340. While this design may have benefits such as efficient power consumption and effective contact with tip 220 of finger 210, it is understood that some additional embodiments could include a plurality of contact pads 340. In these cases, a set of two or more contact pads 340 could be positioned within thimble 140 to contact tip 220 of finger 210 (according to any process described herein) and provide the tactile representation of virtual reality.

Figure 6:
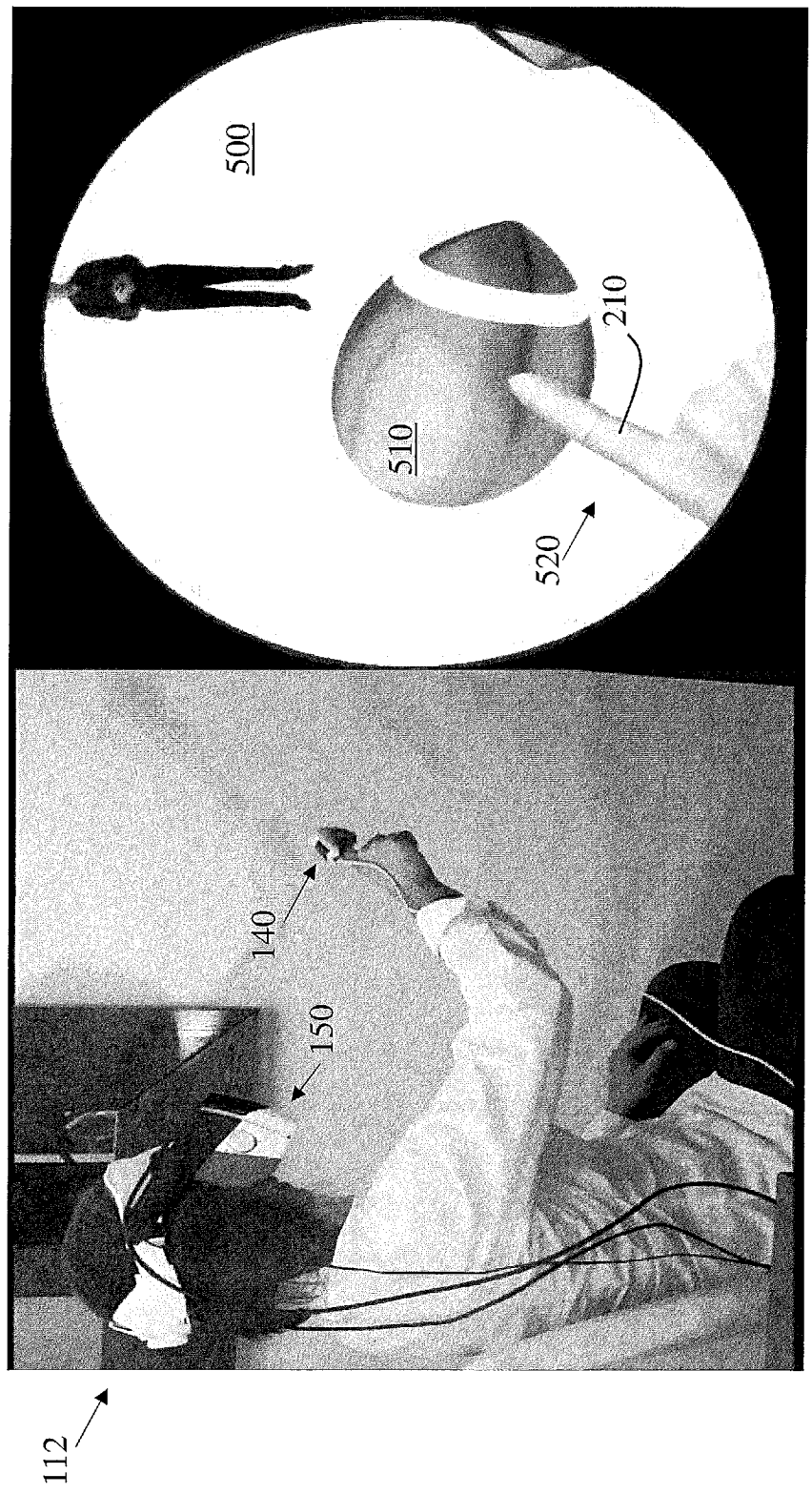
FIG. 6 shows a split-screen view of (left) a user interacting with a virtual reality (VR) system and (right) a displayed screen in the VR system, according to various embodiments of the disclosure.

With continuing reference to FIGS. 1-4, in some cases, thimble 140 includes one or more sensors 400 coupled with attachment mechanism 200, e.g., via housing 270. In some cases, sensor(s) 400 can include at least one of a time-of-flight sensor, an optical sensor, an ultrasonic sensor, etc. Sensor(s) 400 and contact pad(s) 340 can be coupled with computing device 124 (FIG. 1), e.g., with VR system 126, and may send and receive sensor data 60 and VR data 80 between these components. Sensor(s) 400 can be positioned to detect movement of finger 210, and/or the distance between the user's finger 210, e.g., the index finger, and an opposing finger on the user's same hand, such as the thumb. In various embodiments, a particular sensor 400A may be positioned to detect a distance between user's finger 210 and another finger 210 on the user's hand. When the distance detected by sensor 400A, or the position of finger 210 would cause an interaction between the user's virtual hand and an object in the virtual environment, VR system 126 can initiate a tactile representation of virtual reality at the contact pad(s) 340. For example, VR system 126 can initiate a tactile representation of virtual reality at contact pad(s) 340 in response to detecting the position of user's finger 210 interacts with an object, or in response to detecting the distance between the user's finger 210 and an opposing finger meets a threshold based upon the haptic object property/properties (HOP). In various embodiments, as noted with respect to FIGS. 2 and 3, attachment mechanism 200 positions and/or orients user's finger 210 such that finger 210, at rest, does not contact the at least one contact pad 340. That is, according to various embodiments, VR system 126 is configured to instruct an actuator 410 (various types described herein) to initiate movement of contact pad(s) 340 in response to determining that finger 210 is approaching (or withdrawing from) a virtual object 510 (FIG. 6). For example, sensor(s) 400, 400A can indicate that the position of finger 210 is contacting or nearly contacting a virtual object 510, and in response to obtaining this sensor data 60 (FIG. 1), VR system 126 instructs actuator 410 to modify a position of contact pad(s) 340 to contact finger 210, at tip 220. In various particular embodiments, user 112 moves and/or reorients finger 210 in space order to interact with an element of the virtual environment 500 (FIG. 6). When such interactions occur, VR system 126 initiates and/or modulates a tactile response from contact pad 340, for example moving contact pad 340 into contact with finger 210. In some cases, the tactile representation of virtual reality includes a tactile representation of a virtual object.

In various embodiments, as described herein, contact pad 340 can include one of a heating element or a cooling element to provide temperature-based tactile feedback to finger 210 when contacting or nearly contacting that finger 210. For example, in some cases, contact pad 340 can include an electrical, chemical or fluid-based heating element or cooling element. VR system 126 can send instructions to an actuator 410 to initiate one of heating or cooling of the corresponding element to provide a sensation of heat or cold to the finger 210.

It is understood that according to various embodiments, attachment mechanism 200 and contact pad 340 can be configured to retain their relative position (and thus the relative position of finger 210 relative to contact pad 340) regardless of the orientation of thimble 140. That is, actuator 410 can be configured to retain contact pad 340 in its desired position relative to finger 210 when thimble 140 is rotated, inverted, rocked or otherwise manipulated by user 112 such that user 112 experiences an expected tactile response from thimble 140.

In various embodiments, contact pad 340 may move in a direction substantially perpendicular to the platform 420 on which it rests. However, in some cases, contact pad 340 can be configured to move at an angle other than normal with respect to platform 420, and can be configured to move across a portion of the fingertip 220 of user 112. In some cases, contact pad 340 is configured to move across a range of angles relative to platform 420 in order to contact fingertip 220 of user 112 and produce a tactile representation of virtual object 510 (FIG. 6).

FIG. 6 shows a split-screen image of a user 112 interacting with the environment 102 (FIG. 1), including haptic thimble 140, HMD 150 and VR system 126. User 112 is wearing haptic thimble 140 and HMD 150, and viewing the virtual environment 500 shown on the right-hand side of FIG. 6. User 112 sees a virtual object 510 within virtual environment 500, as well as a representation 520 of her hand (including finger 210). In this illustrative example, user 112 has moved her hand such that its corresponding representation 520 is contacting virtual object 510 (e.g., a football in this example), and VR system 126 has moved and/or otherwise actuated contact pad 340 relative to haptic thimble 140 to contact finger 210 so that user 112 will experience a tactile representation (e.g., texture, temperature, etc.) of the virtual object 510. In this particular case, VR data 80 indicates that the virtual object 510 is a football (having properties such as surface texture, softness, and temperature), and sensor data 60 (from sensors 400, 400A) indicates the distance that finger 210 has penetrated virtual object 510 and the present velocity vector of finger 210 relative to virtual object 510. Based upon that VR data 80 and sensor data 60, VR system 126 provides tactile representation instructions 90 (FIG. 1) to haptic thimble 140 in order to simulate a response from virtual object 510, e.g., provide greater resistance to pressure as greater pressure is applied, and/or output a specific vibration waveform as user's finger moves tangentially across contact pad 340 to simulate roughness, and/or a thermal actuator adjusts the temperature of contact pad 340 to simulate the present temperature and thermal conductivity of the object etc. That is, virtual object 510 represents a real-world object (e.g., a football) with a set of expected tactile qualities (e.g., hardness, roughness, temperature), and the tactile representation (executed by tactile representation instructions 90) provides the human user with at least one of that set of expected tactile qualities.

Figure 7:
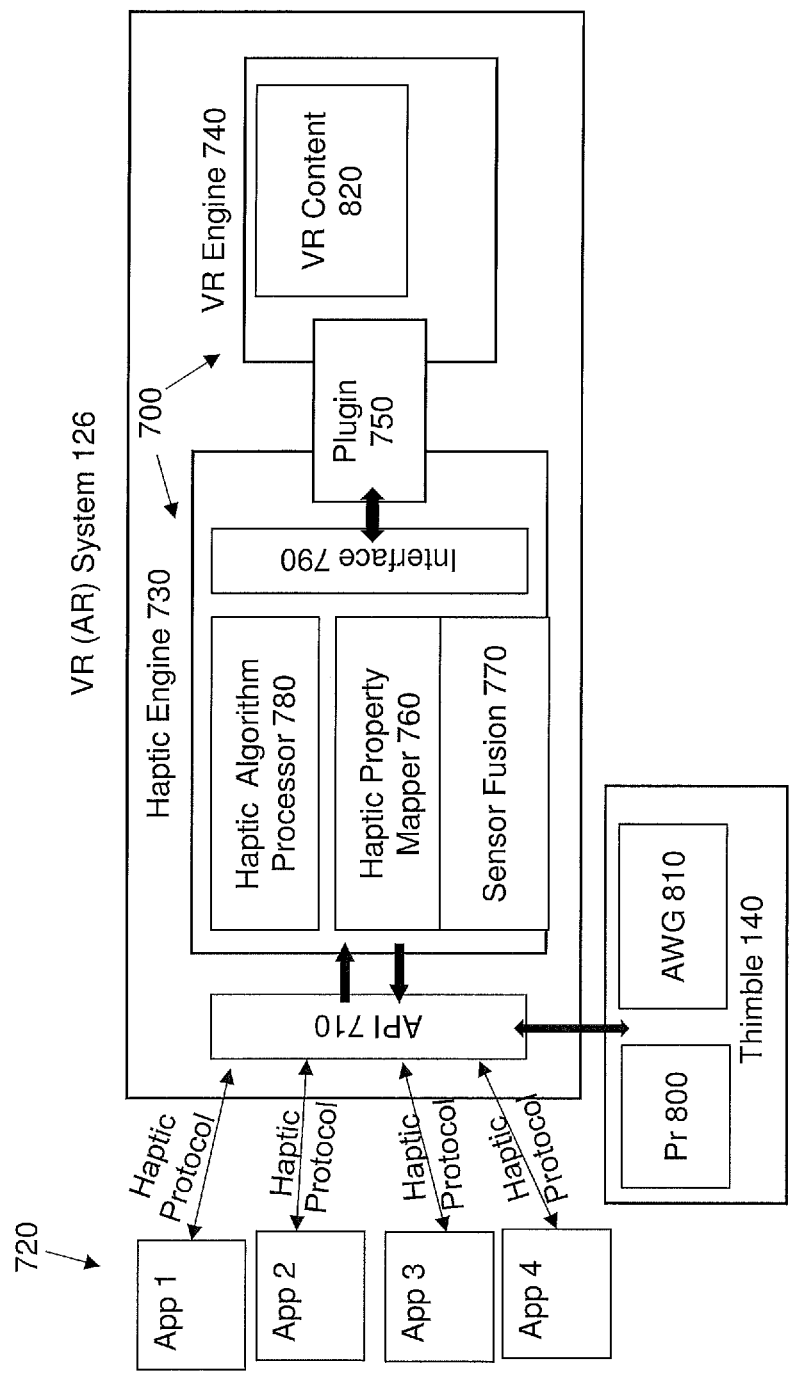
FIG. 7 shows a data flow diagram illustrating aspects of the VR system of FIG. 1.

In various embodiments, as shown in FIG. 7, haptic VR system 126 can further include a set of engines 700 for performing functions described herein. In some cases, VR system 126 can include an application program interface (API) 710 for interfacing with one or more external applications 720 (e.g., App 1, App 2, etc.). In some cases, external applications 720 are configured to interact with VR system 126, and consequently, haptic thimble 140, via a haptic protocol. This haptic protocol can include information such as the virtual surface identity, virtual surface properties, platform position, temperature, etc. for the AWG 810 to generate the tactile sensations for the user to feel (together, the dynamic tactile wave). In some cases, external applications 720 include at least one of: games, shopping activities, educational activities, manual skill training, or medical training. VR system 126 can further include a haptic engine 730 connected with API 710, and a VR engine 740 connected with haptic engine 730. The VR engine can be used to run some VR content, such as games, shopping activities, educational activities, manual skill training, or medical training. In some cases, VR engine 740 is connected with haptic engine 730 via one or more plugin(s) 750. Haptic engine 730 can include a haptic object property mapper 760, a position predictor 770, a haptic algorithm processor 780 and an engine interface 790 (coupled with position predictor 770 and haptic algorithm processor 780). In some cases, haptic thimble 140 can include a processor (Pr.) 800 and an actuation wave generator (AWG) 810. According to various embodiments, VR system 126 is configured to perform various functions in conjunction with haptic thimble 140. For example, VR system 126 can be configured to:

A) Assign haptic object properties (HOPs) to a virtual object by matching visual properties of the surface of that virtual object to an existing library of textures. For example, haptic engine 730 can select a virtual object with a pre-assigned HOP from a pre-constructed library and assign that object's tactile properties to a new virtual object. Aspects of pre-constructed libraries are described in U.S. Pat. No. 8,988,445, which is hereby incorporated by reference in its entirety. In any case, a virtual object is connected with one or more HOPs, which can be used as the basis for further processes described herein.

B) Calculate and predict the position of the virtual finger of user 112 as it is about to come in contact with the virtual object, so as to begin driving actuator(s) within haptic thimble 140 to create a corresponding tactile representation of the virtual object, e.g., by generating particular waveforms associated with that tactile representation. In some embodiments, predicting the position of the virtual finger enables the system to minimize latency in creating the tactile representation.

C) Interface with VR engine 740 to relay information about the current position of the contacted point on the surface of the virtual object and information about various surface parameters of the object.

D) Calculate the shape of various waveforms (e.g., complex waveforms) required to construct the tactile representation of the virtual object, including for example surface texture, temperature, the presence or absence of contact, and the strength of contact.

E) Transmit data from processes (A)-(D) to processor 800 in thimble 140, where processor 800 initiates instructions to actuation wave generator 810 for generating a dynamic tactile wave to provide the tactile representation of the virtual object. AWG 810 can also be part of the VR system on the computer, in which case PR 800 will be used to process and dispatch the dynamic tactile wave to the appropriate low level driver 870.

In various embodiments, the thimble 140 can include one or more of the following features:

A device body that houses the main actuator(s) and possibly components of the motion tracking system. It may conform to the back of the user's finger and may include a layer of rubber or another soft material along this surface, to spread out the pressure of contact and ensure the device is comfortable. It may be helpful to have a mechanical stop to indicate that the finger is positioned at the correct location in the device.

An adjustable strap that may be made of hook-and-loop fasteners; it securely attaches the device body to the distal and/or middle segment of the user's finger. Other attachment approaches could be employed instead of the adjustable strap. Fingers come in a wide range of shapes and sizes, so adjustability is beneficial, as is the security of the resulting bond. (See section on attachment mechanism.)

A platform that can move along a line that is approximately perpendicular to the fingertip surface at the center of the area of contact. The inventors' testing showed that humans often approach surfaces at about a 20 to 30 degree angle, so the inventors set this platform at a 20 to 30 degree angle relative to the long axis of the finger. This platform begins away from the finger pad and moves into contact with the finger pad when virtual contacts occur.

An electromechanical actuator that moves the platform along its line of motion. This degree of freedom may be approximately 5 mm of travel or more, with a maximum force output of at least about 1.5 N to create graded sensations that will be salient to the user.

An electromechanical actuator that vibrates the platform to simulate the feel of touching textures. This may or may not be the same actuator as the one that moves the platform. The device may be capable of outputting vibrations from close to 0 Hz all the way up to 500 Hz, which is approximately the highest vibration frequency that a human can feel, as described in: Roland S. Johansson & J. Randall Flanagan, Coding and use of tactile signals from the fingertips in object manipulation tasks, Nature Reviews Neuroscience 10, 345-359 (May 2009), which is hereby incorporated by reference in its entirety.

A thermal control system embedded in the platform or somewhere nearby to heat and cool the user's fingertip to simulate the feeling of touching virtual objects.

While various particular embodiments of thimble 140 are described herein, there are a wide variety of approaches one could take to realize such a device. For example, a single electromechanical actuator can control both the large-scale movement and the vibrations of the platform, or these tasks can be split between two separate actuators. If they are split, the powerful actuator can be positioned either below or above the user's finger, and the vibration and/or thermal actuators can to be placed on the platform.

Moreover, the VR system 126 (FIG. 1) disclosed according to various embodiments can use pseudo-haptics with sensory feedback other than touch to supplement the haptic feedback provided to the user. Pseudo-haptics is giving a sense of physicality to virtual objects by modifying a user's perception of their body relative to the virtual object using sensory feedback other than touch (e.g., sight, sound).

In some cases, VR system 126 is configured to initiate sounds synchronized with finger movements to supplement the information coming from the fingertip(s). VR system 126 may be configured to initiate such sounds to make the haptic illusion more convincing. For example, VR system 126 can send operating instructions to HMD 150 to initiate one or more sounds from a speaker system contained within HMD 150. These operating instructions can be synchronized with tactile representation instructions 90 such that platform 340 contacts the fingertip 220 in coordination with the desired sound produced in HMD 150 (FIGS. 1-4). Examples of using sound to enhance touch include, but are not limited to: sound when the fingers come in contact with an object, sound when the fingers leave contact with an object, and sounds to provide additional texture cues such as roughness or dryness. Sounds produced by the haptic interactions can also be accurately localized in space using three-dimensional mapping of the sound source (hand) and the user's ears to make the interaction more convincing. In another example, the visually depicted position and/or orientation of the user's finger in the virtual environment can be distorted so that it does not perfectly correspond to the true position of the user's finger in the real environment. Displaying the finger staying on the surface of a hard virtual object, even though the user's real finger has penetrated that space, reinforces the presented tactile feedback and helps give the user the illusion that an object is occupying that space.

Various embodiments of VR system 126 (FIG. 1) include a software dynamic link library (DLL) to enable determining the position and orientation of the user's finger in real time. Another embodiment uses external optical tracking, which provides the global position and heading of thimble 140 relative to HMD 150, plus an inertial measurement unit (e.g., an on-board nine-degree-of-freedom (DOF) IMU) that, when fused with the optical tracking system, allows the VR system 126 to reliably obtain the position and orientation of the user's fingertip 220. The heading cue from the optical tracking system is used to compensate for the fact that the IMU's onboard magnetometer may not be used to correct for drifting of the IMU, given the magnetic field interference created by the system's actuators and the typically low strength of Earth's magnetic field within indoor environments. Appropriate coordinate transformations are performed to align the movement shown in the HMD with the motion being made by the user 112.

When new finger position and orientation data are obtained, the system may solve the full six-DOF (degree-of-freedom) inverse kinematics for the selected arm of a human-like avatar. The joint angles of this avatar arm are then updated on screen to move the depicted index finger into the position and orientation of the user's finger. If the user moves outside the reach of the avatar, the avatar is shown at the closest possible configuration. In an alternative embodiment, the user's hand or only the finger are shown as a floating entity, without an arm. The graphics may simply let the user see where their finger is currently located in the virtual world.

The virtual environment can be composed of and contain a near infinite range of virtual objects. Ahead of time or when a scene is loaded, the software determines the HOPs for all surface areas of each object that can be touched by the user. This information can be stored along with the object's shape, visual appearance, and collider mesh. Each point on an object can have different HOPs, but they are generally divided into larger regions of points that are of a similar material. A given material's HOPs may include the following items:

I) Transient vibration and/or force responses to be produced by an actuator within the haptic thimble at the start of contact. Contact transients for interactions with real objects typically vary with the normal velocity of impact and resemble a decaying sinusoid whose frequency, amplitude, and decay rate depend on the material. They typically last about 0.100 seconds or less. The parameters of the appropriate transient vibration and/or force response are calculated at the start of contact, based on the contacted object's properties and the contact movement, and this transient is then output by one or more actuators within the haptic thimble for the user to feel. In one instantiation, this transient is output by a vibration actuator embedded in the contact pad. In another instantiation, this transient is output by an actuator responsible for translational movement of the contact pad.

II) The linear or nonlinear stiffness of the virtual object, which shows how the force should change (typically increase) with increasing user finger penetration. This information can be stored as a mathematical function or as a discrete set of points that relate penetration to force. Typically, the force at zero penetration will be zero, but it may be nonzero. The moving platform within the haptic thimble is used to present the calculated force at each time step to the finger of the user by pressing the appropriate amount.

III) A comprehensive texture model, which shows the vibration and/or force responses to play when the finger slides along the object's surface. These vibrations generally vary with finger speed and normal force, to match how real objects feel to touch; this information can be stored in a variety of ways, such as the coefficients of a set of filters that produce suitable vibrations when driven with white noise. These vibrations are tactilely displayed to the user using one or more actuators within the haptic thimble. In one instantiation, a vibration actuator within the contact pad vibrates so that the user can feel the texture vibration. In another instantiation, the actuator in charge of moving the platform also outputs these vibrations. A version of the vibration waveform may also be used to modify the visual scene being displayed, e.g., by visually vibrating the finger in a similar manner.

IV) A comprehensive friction model that shows the properties of the static and/or kinetic friction present between the virtual object and the virtual finger of the user. Static friction acts when there is no tangential relative motion between the two items, to oppose the motion that would occur in its absence, and kinetic friction acts against tangential relative motion while it is occurring. The calculated friction force may be presented to the user via one or more actuators within the haptic thimble. It may also be used to modify the visual feedback presented to the user.

V) The thermal conductivity of the virtual object, which shows how well the material conducts heat. For example, metals have high thermal conductivity, and wood generally have low thermal conductivity. As human skin is generally warmer than room temperature, contact with real objects results in heat transfer from the finger to the object. How the temperature changes over time provides a human with information about that object's properties. Thus, such a temperature profile can be calculated and tactilely displayed to the human user using one or more thermal actuators incorporated into the haptic thimble.

VI) Transient vibration and/or force responses to play at the end of contact; these are typically smaller than the transients at the start of contact, unless the object is sticky or adhesive. They are calculated and displayed similar to the transient vibration and/or force responses played at the start of contact.

HOPs can be specified by a programmer when they are editing a virtual scene, just as the visual appearance of objects can be modified. However, users can also interact with environments that were not created with haptic feedback in mind. Thus, the system also supports an alternative method of endowing virtual objects with HOPs based on their visual properties.

In this approach, the system can estimate appropriate HOPs by analyzing the object itself, including any available characteristics, such as its visual texture, shape, size, location, and name. In one instantiation, the system matches the appearance of the virtual object or surface into a database. It finds the most likely match and uses the HOPs associated with that surface from the database. In another instantiation, the system calculates some or all of the HOPs directly from the virtual object's properties, for example creating a texture model of a rock directly from the visual texture and object size information obtained from a virtual rock. Being able to estimate with reasonable accuracy the HOPs for virtual objects that have not been explicitly labeled with HOPs is one of various distinctions between the disclosed approach and conventional approaches.

The computer sends the processor in thimble 140 a list of all HOP sets present in the virtual environment when the scene is first loaded. The HOP properties of new objects are sent to processor in thimble 140 as they enter the scene. In one instantiation, the computer sends sets of values listed above and then later refers to these sets by index number. In another instantiation, the computer sends index numbers from a pre-existing database of HOPs, possibly with modifications to properties that differ from those in the database. The goal of this step is to make the external processor aware of the HOPs that will be used in the ensuing interaction so that the associated haptic interaction models can be readied for use. It is also possible to omit this step of sending HOPs ahead of time and simply send them with every message about contact. Furthermore, the HOPS themselves may never be transmitted to the processor in thimble 140; instead, the dynamic tactile wave signals could be calculated on the main computer and simply output over time by the processor in thimble 140.

When a human finger is in contact with a physical object, the finger is stopped by the physical material of the object and cannot penetrate the object. This is not the case with virtual objects, as they have no physical material. When the software system detects that the tip of the user's finger is located at a position and orientation that cause it to penetrate a virtual object, it will display the avatar's finger exactly at the surface of the object, rather than showing that the virtual finger has penetrated the object. The avatar's fingertip is shown on the surface of the object rather than inside to remain consistent with the presence of the virtual object. This visual modification of the depicted movement helps convince the user that the depicted object is physically present.

Similarly, the system can modify the physical location of the virtual finger along the surface of the object to convey surface properties such as texture and friction. The finger position and/or orientation can be slightly perturbed away from the measured values in an oscillatory manner to visually depict the effects of texture on the finger. Static friction can be visually displayed by holding the finger in place until the user moves at least a fixed distance away, giving the illusion that the finger is stuck. Once relative movement has begun, kinetic friction can be shown by causing the virtual finger to visually lag behind the real finger, making the user feel like he or she has to pull the virtual finger along the surface. Other visual effects are also possible to provide the user with information about the haptic finger-surface interaction taking place.

Every time new motion data is available, the system can calculate the following interaction variables for each finger, using units such as those shown in parentheses:

Depth of finger penetration into the surface (mm);

Normal speed of the finger relative to the surface (mm/s);

Tangential speed of the finger relative to the surface (mm/s);

Orientation of the finger relative to the gravity vector (unit quaternion);

Orientation of the surface normal being contacted (unit vector);

Temperature of the contact point on the object (degrees K);

Thermal conductivity of the material at the contact point on the object (W/(m K)); and/or Which HOP set is involved in this interaction (index number).

The penetration depth value is used to signal whether contact is presently occurring; for example, 0 can indicate no contact, and positive values can indicate penetration of the finger into the object. Some range of penetration depths, such as negative values, can be used to indicate that the finger is close to coming into contact with an object. This information is useful for anticipating contact either mechanically, thermally, or computationally, so that the haptic thimble 140 is ready to deliver sensations when contact does occur. If contact is not occurring, the other variables can still be used to indicate interactions with ephemeral items in the virtual object, such as wind.

These interaction variables are all sent to the processor over a connection such as USB. After receiving each new interaction packet, the processor calculates the appropriate actuation commands and sends them to the thimble device(s) in use. A wide range of mappings can be used to decide how to drive the device in a given scenario.

Figure 14:
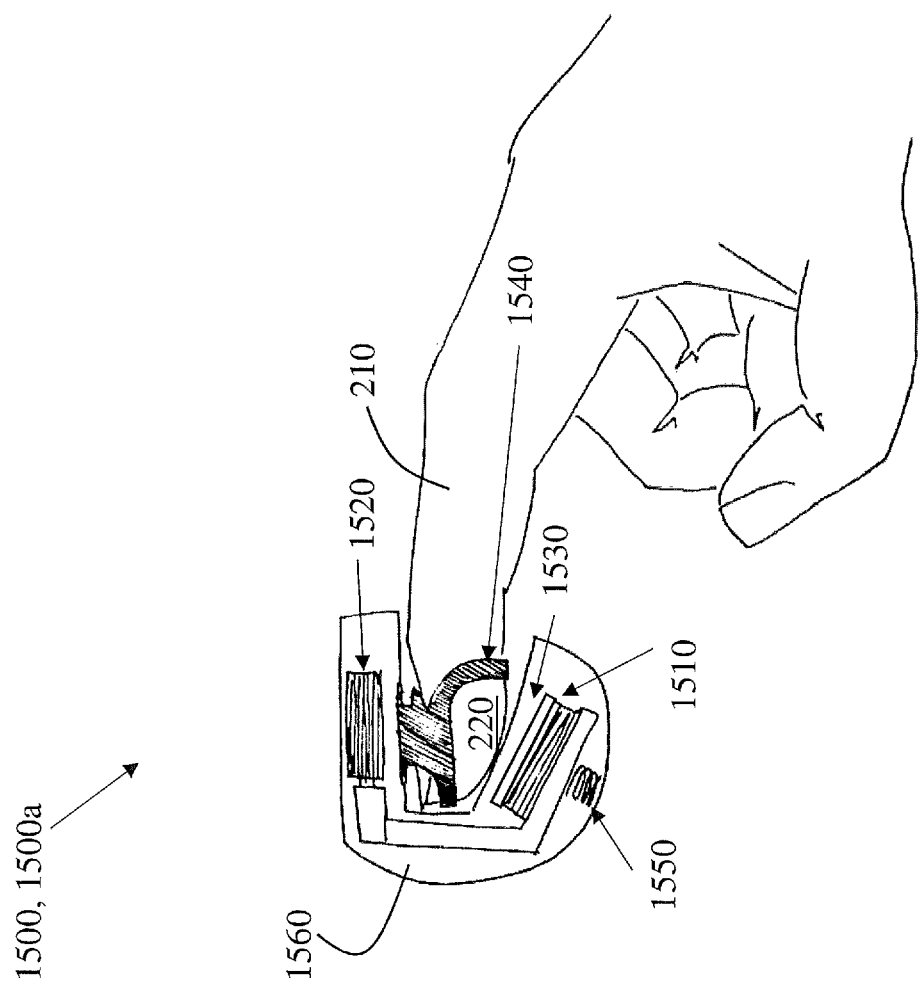

For example, when the penetration depth indicates no contact is occurring, the platform is kept away from the user's finger pad. It can be held through a passive mechanism, such as a spring, or via an active actuator. The example haptic thimble 1500 in FIG. 14 depicts use of a spring 1550 to maintain the position of a contact pad 1530 relative to a fingertip 220, according to various embodiments. In other cases, the system can optionally use the reported orientation of the finger relative to the gravity vector to compensate for gravity and actively push the platform away from the finger with the appropriate amount of force. The actuators in the device may still be able to create sensations that will be felt by the user, by vibrating the platform relative to the device body; these vibrations may be transients or sustained, depending on the type of interaction taking place. In certain instantiations of the system, the platform's distance from the fingertip is modulated to reflect the distance of the virtual finger to the virtual object. This facilitates the handling of light strokes and enables more realistic start-of-contact sensations.

When the penetration depth value indicates that contact is occurring, the platform can be brought into contact with the fingertip. The position or force of the platform is determined by the penetration depth and the virtual object stiffness, as well as optionally the orientation of the surface being contacted. Because the thimble is grounded to the fingertip, it cannot apply a grounded kinesthetic force to the user's finger, so the finger will not be prevented from moving. But the tactile cues will resemble those that occur during real object contact. At the start of a new contact, the appropriate contact transient can be calculated and played through the appropriate actuator. Similarly, the appropriate contact transient can be calculated and played at the end of each contact. In some cases, a small amount of hysteresis could be added between the reported penetration depth value and the commanded contact state to prevent oscillations around this discontinuity, as such oscillations may distract the user and reduce the realism of the interaction.

In order to compensate for the fact that the thimble is not grounded, various coefficients can be applied in a linear or nonlinear manner to the distance or force commanding the platform to improve or modify the user's perception of pressure or proximity.

In various embodiments, when the user's finger is contacting but not moving tangential to the virtual surface (tangential speed less than a small threshold selected to be robust to noise), no vibrations are played, as the finger is stationary on the virtual surface. And in some embodiments, when the finger is contacting and moving relative to the surface, the appropriate vibration waveform is generated and output to the device. The vibration waveform can be calculated at a rate such as 1000 Hz, which may be faster than the rate at which interaction data packets arrive. Thus, the processor may need to continue calculating the waveform for the time between data packets, assuming constant interaction conditions or estimating how those interaction conditions are changing over time. The texture vibration waveform itself can be determined according to the HOP's texture model as well as the normal force and the tangential finger velocity, described in U.S. Pat. No. 8,988,445, which is hereby incorporated by reference in its entirety.

Using thimble 140 to interact with a virtual environment can extend beyond simply exploring how objects feel. The disclosed embodiments also allow the user to interact with traditional interaction elements such as buttons, control panels, and sliders.

The haptic thimble 140 disclosed herein can also include physical buttons to provide additional controller inputs for functions that cannot be achieved using finger movements. These physical buttons may be located on the side(s) or other surfaces of the thimble, for accessibility by other fingers on the same hand, such as the thumb, or by fingers on the other hand.

Since the position of the device will constantly be tracked, it can also support gesture recognition. Gesture recognition is the ability of the computer to capture and interpret arm and hand gestures produced by the person using the device. Gestures can be linked to computer commands and provide an additional mean of human-computer interaction for actions such as navigating menus and accessing applications.

Figure 8:
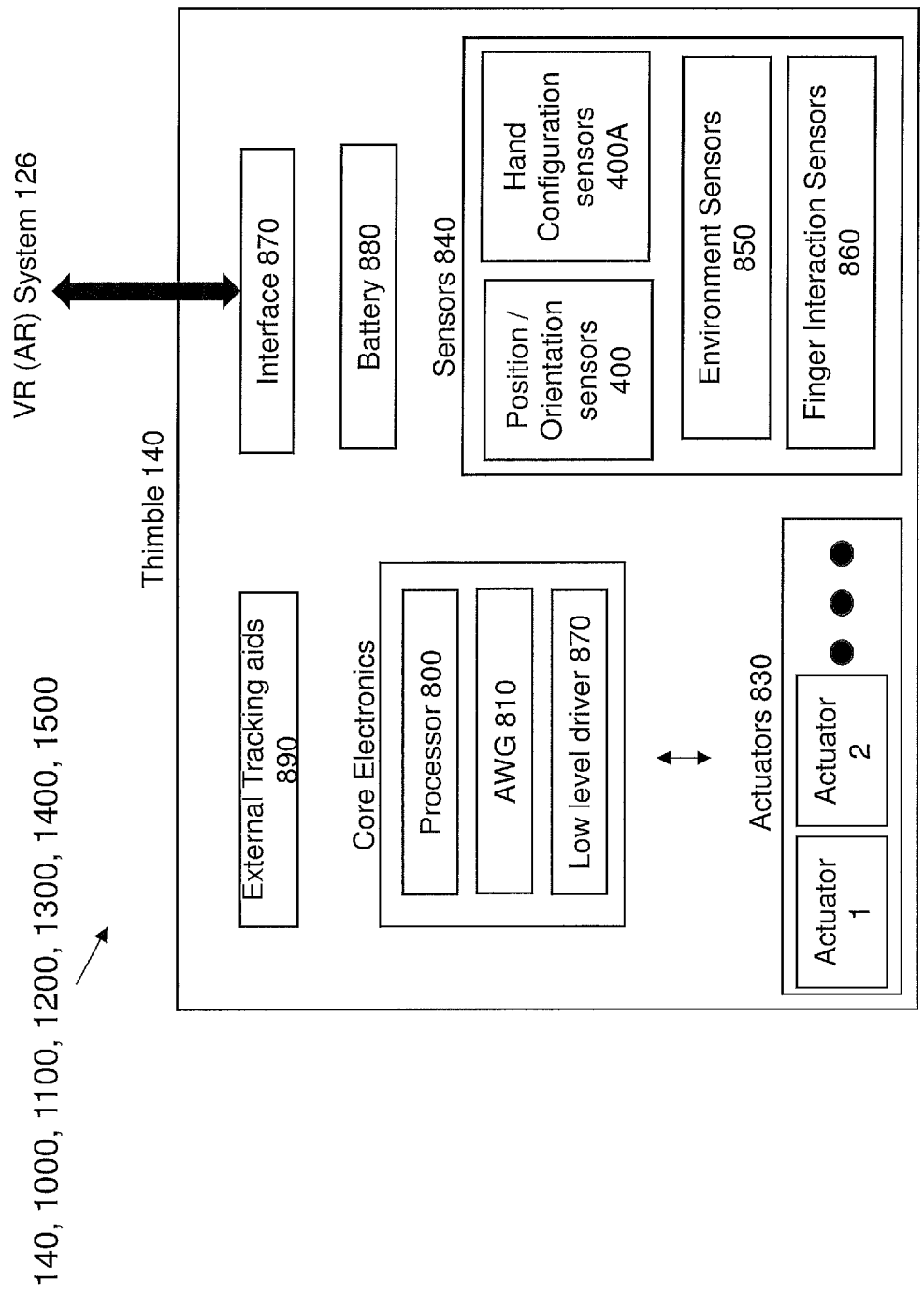
FIG. 8 is a schematic depiction of a system architecture for a haptic thimble according to various embodiments of the disclosure.

FIG. 8 shows an example depiction of portions of a system architecture within haptic thimble(s) 140, or other haptic thimble(s) 1000, 1100, 1200, 1300, 1400 and 1500 (*a*,*b*) described in conjunction with FIGS. 9-15. It is understood that one or more components in the system architecture may be present in one or more embodiments of the haptic thimbles shown and described herein. In various embodiments, thimbles(s) 140, 1000, 1100, 1200, 1300, 1400, 1500 can include an actuator 830, which may include one or more electromechanical actuators, e.g., for moving and/or vibrating a platform, and/or heating/cooling elements, e.g., for providing a temperature sensation to the user. Actuator(s) 830 can be coupled with core electronics, including, a low level driver 870 for driving actuator 830 to perform the various functions described herein. Additionally, thimbles 140, 1000, 1100, 1200, 1300, 1400, 1500 can include a plurality of sensors 840, which may include position/orientation sensors, such as sensors 400 (FIG. 2) and hand configuration sensors, such as sensors 400A (FIG. 2).

Position/orientation sensors can indicate a position of thimble 140 in space, or relative to other thimble(s), and HMD, along with its orientation relative to other thimble(s) or an HMD. Hand configuration sensors can include a grasp sensor and may also rely upon position/orientation sensors to detect the position of particular fingers of the user. Finger interaction sensors 860 can detect contact, pressure and/or temperature on the finger to provide feedback to actuators 830. Further, environmental sensors 850 can detect environmental conditions such as temperature, pressure and/or hygrometry. The system architecture may also include an interface 870 for connecting thimbles(s) 140, 1000, 1100, 1200, 1300, 1400, 1500 with VR system 126. In some cases, interface 870 can include a Wi-Fi connection, a USB connection, or other wireless technology connection. In some cases, the architecture further includes battery or other power storage mechanism, although this is not necessary in all embodiments. In various embodiments, thimble(s) 140, 1000, 1100, 1200, 1300, 1400, 1500 can include a hard-wired power connection. In some cases, the architecture can further include external tracking aids 890 that enable an external tracking device to locate and/or orient the thimble(s) 140, 1000, 1100, 1200, 1300, 1400, 1500. These external tracking aids 890 can include sensors (as described herein), light-emitting diodes (LEDs), reflectors, or particular visible markings.

EXAMPLES

Single-Actuator Thimble

Figure 9:
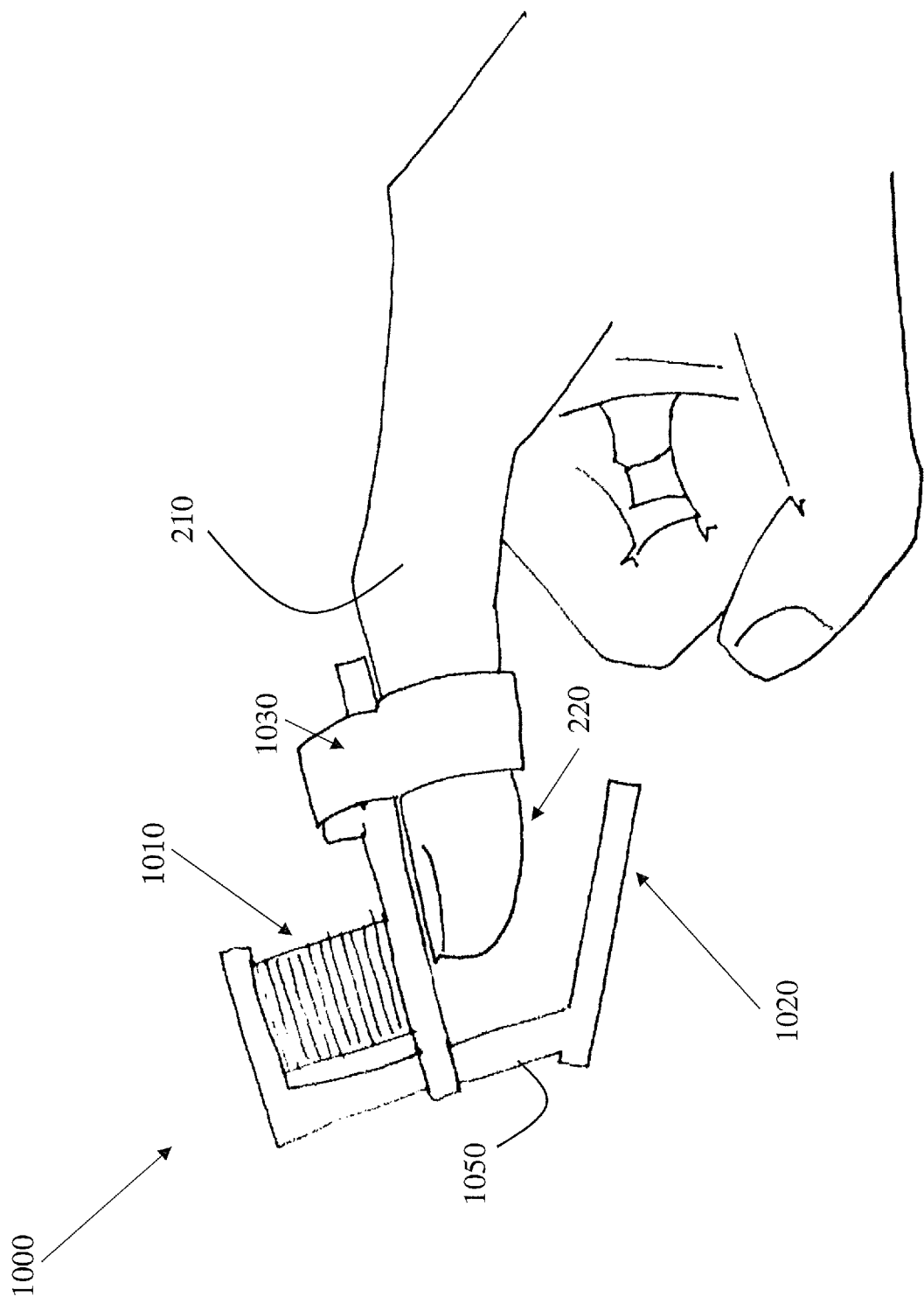
FIGS. 9-15 show schematic depictions of haptic thimbles according to various embodiments of the disclosure.

FIG. 9 shows an example of a single-actuator thimble 1000 according to various embodiments of the disclosure. As shown, single-actuator thimble (or, thimble) 1000 can include an actuator 1010 (including any actuator discussed herein), and a platform 1020 coupled with actuator 1010 for contacting tip 220 of finger 210. In some cases, single-actuator thimble 1000 can include a fastener 1030 for fastening the housing 1050 of thimble to finger 210. In some cases, fastener 1030 can include a strap sized to wrap around the finger 210. For a single actuator to control both the large low-frequency and small high-frequency motion of the platform, it may be useful to have continuous force output of at least 1.5 N, a linear travel range of at least 5 mm, and high-frequency bandwidth of at least 500 Hz. Furthermore, it may be useful for the thimble 1000 to have low total mass (less than about 30 g) to avoid tiring the user's finger and low moving mass to ensure quick dynamic response.

In some cases, a voice-coil actuator (VCA), which includes a strong permanent magnet located inside an electromagnetic coil, can be a suitable fit for the system. Applying current of one polarity to the coil creates a repulsive force between the magnet and the coil, and flipping the sign of the current creates an attractive force. In both cases, the magnitude of the force is approximately proportional to the amplitude of the current passing through the coil (it slightly depends on the coil's position relative to the magnet).

In some cases, a cylindrical-shaped VCA, e.g., with a 16 mm diameter and a length that varies from 17.5 mm (fully contracted) to 23.9 mm (fully extended), can be useful for this application. Its maximum continuous force in some cases is 1.8N, and its linear travel range in some cases is 6.4 mm. Because force is proportional to current, and it is possible to create a high-bandwidth current control circuit, voice-coil actuators can provide high-bandwidth vibration actuation up to and exceeding 1000 Hz [As described in: "Vibrotactile Display: Perception, Technology, and Applications" by Seungmoon Choi and Katherine J. Kuchenbecker. Vol. 101, No. 9, September 2013|Proceedings of the IEEE, which is hereby incorporated by reference in its entirety.].

Single-Actuator Thimble, Mounting Above

In some embodiments the actuator 1010 is mounted above the user's finger 210, as illustrated in the example of FIG. 9. In various embodiments, actuator 1010 (e.g., VCA magnet) is mounted to the body of the first single-actuator device and the coil to the moving platform, to keep the moving mass low and constraining the motion of the platform to be purely linear.

This example thimble 1010 uses a voice-coil actuator positioned directly behind the user's fingertip to both move and vibrate the slanted contact platform. In some cases, the coil is attached to housing 1050, including platform 1020, and the actuator 1010 (e.g., magnet) is attached to housing 1050. In other cases, the magnet is attached to housing 1050, including platform 1020, and the actuator 1010 (e.g., coil) is attached to housing 1050. In some cases, adding a high-frequency oscillating waveform to the low-frequency force command, via actuator 1010, generates vibrations that the user feels at the fingertip 220.

In some cases, applying a steady-state current to the actuator 100 (e.g., VCA) moves the coil away from the magnet. Either the coil or the magnet can be rigidly attached to the platform 1020 via a beam that runs down in front of the fingertip; this beam constrains the motion of the platform 1020 to be a linear translation. Thus, moving the coil away from the magnet brings the platform 1020 into contact with the user's fingertip 220. Increasing the current proportionally increases the applied force. Adding an AC (alternating current) component to the actuator's 1010 (VCA) steady-state current can cause the platform to vibrate up and down, which can simulate contact with a textured surface.

Single-Actuator Thimble, Mounting Below

Figure 10:
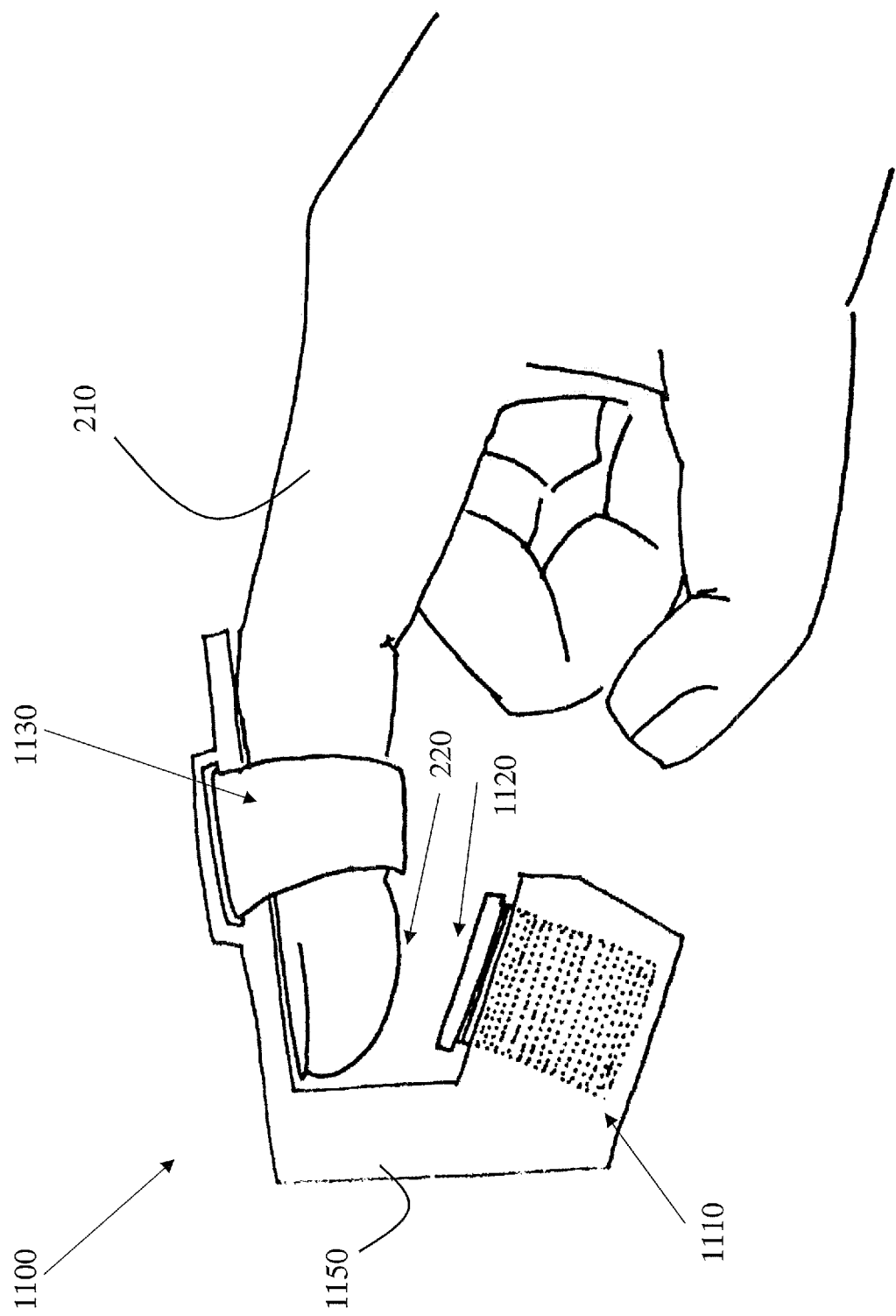

FIG. 10 shows another embodiment of a thimble 1100 according to various embodiments, including an actuator 1110 mounted below the fingertip 220 of finger 210. This configuration may be similar in some respects to thimble 1000 in FIG. 9, e.g., including a fastener 1130 for retaining a housing 1150 proximate fingertip 220. In this case, platform 1120 is located over actuator 1110, which is also located below fingertip 220. In this case, the actuator 1110 (e.g., magnet of a VCA, and the coil) is free to move up and down to both make and break contact with the fingertip 220 and to output vibrations. This design can minimize the thimble's 1100 moving mass, so that the motion of the platform 1120 is sufficiently fast. In thimble 1100, linear bushings may not be needed, which can simplify the design and provide for smooth linear motion of platform 1120 relative to fingertip 220.

In some cases, thimble 1100 uses a voice-coil actuator positioned directly below the user's fingertip 220 to both move and vibrate the contact platform 1120 on the top of the coil.

The sleek structure of thimble 1100 can prevent collision with the user's other fingers and keeps the device light. Applying a steady-state current to the VCA can move the mobile VCA component, for example the coil, up away from the stationary VCA component, for example the magnet, and toward the user's finger 210 with a force proportional to the current. One part of the VCA, for example the magnet, can be rigidly attached to the user's finger 210 via housing 1150 and fastener 1130 along the back of the finger 210. A steady-state current can also be used to compensate for the weight of the platform, so that it does not contact the user's fingertip 2220 when the fingerpad faces upward. Adding an AC (alternating current) component to the VCA's steady-state current can cause the platform 1120 to vibrate up and down, in the same manner as described with reference to thimble 1000, thereby simulating contact with a textured surface.

Both thimbles 1000 and 1100 can provide a low- and high-frequency platform motion useful for VR applications. These devices are force controlled, so it may not be necessary to know the size of the user's fingertip 220 in order to apply a specific touch cue. Another benefit of these designs is that a thermal control device can be mounted to the platform to deliver thermal stimuli. In some cases, a thermal electric cooler (TEC, also known as a Peltier) could be mounted on the moving platform 1010, 1110 of thimbles 1000, 1100. The TEC can be small enough to fit in this space and not significantly increase the mass of thimbles 1000, 1010.

Dual-Actuator Thimble, Mounting Below

Figure 11:
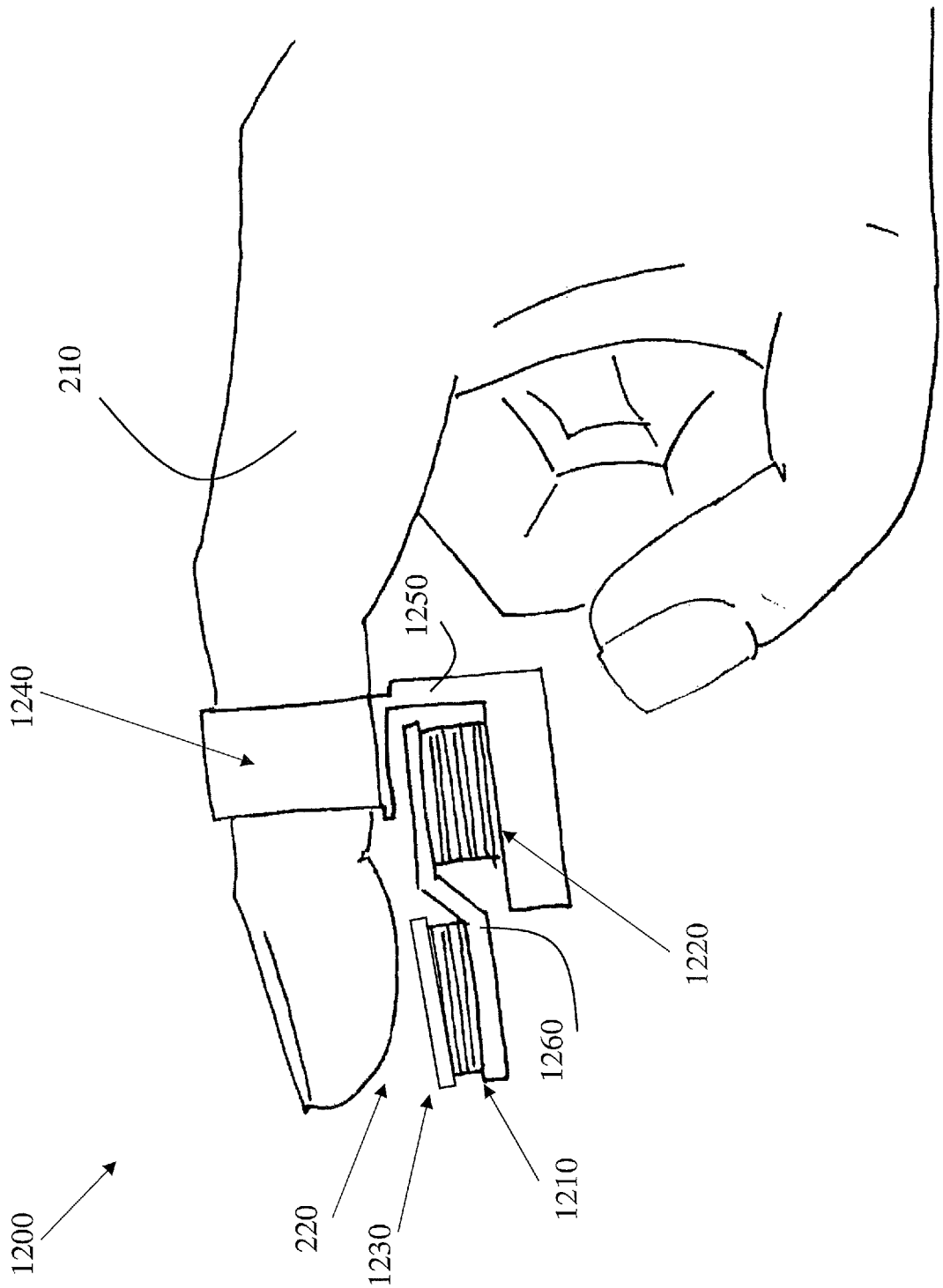

FIG. 11 shows another embodiment of a thimble 1200 according to various embodiments. This thimble 1200 can include a set of two actuators 1210, 1220 for controlling contact of a platform 1230 with fingertip 220. Actuators 1210, 1220 and platform 1230 can be connected with housing 1250, which may be fastened to finger 210 via a fastener 1240. In this case, thimble 1200 can use actuator 1220, which is located closer to the base of finger 210, to control contact between fingertip 220 and platform 1230; and actuator 1210 (located below platform 1230, and in contact with that platform 1230) to control finer contact functions, such as providing simulation of textures. In some cases, actuators 1210 and 1220 can be coupled by a coupler 1260, which may be include an angled member extending between an outer surface of actuator 1220 and an inner surface of actuator 1210 (inner surface opposite platform 1230). This configuration can allow for dedicated actuators 1210, 1220 for each function, thereby increasing the efficiency of operation of thimble 1200 relative to other embodiments.

Various actuators for moving the platform into contact with the fingertip 220 could be used for thimble 1200, as well as in other thimble(s) 140, 1000, 1100, 1200, 1300, 1400, 1500 described herein. As actuators 1210, 1220 do not need to be able to deliver high-bandwidth vibration outputs, these actuators 1210, 1220 can include a geared DC motor, which can apply much higher forces that a VCA. In some cases, platform 1230 can be moved using a miniature hobby servo motor. These actuators 1210, 1220 can be position-controlled, moving to the specified position under closed-loop control.

Figure 12:
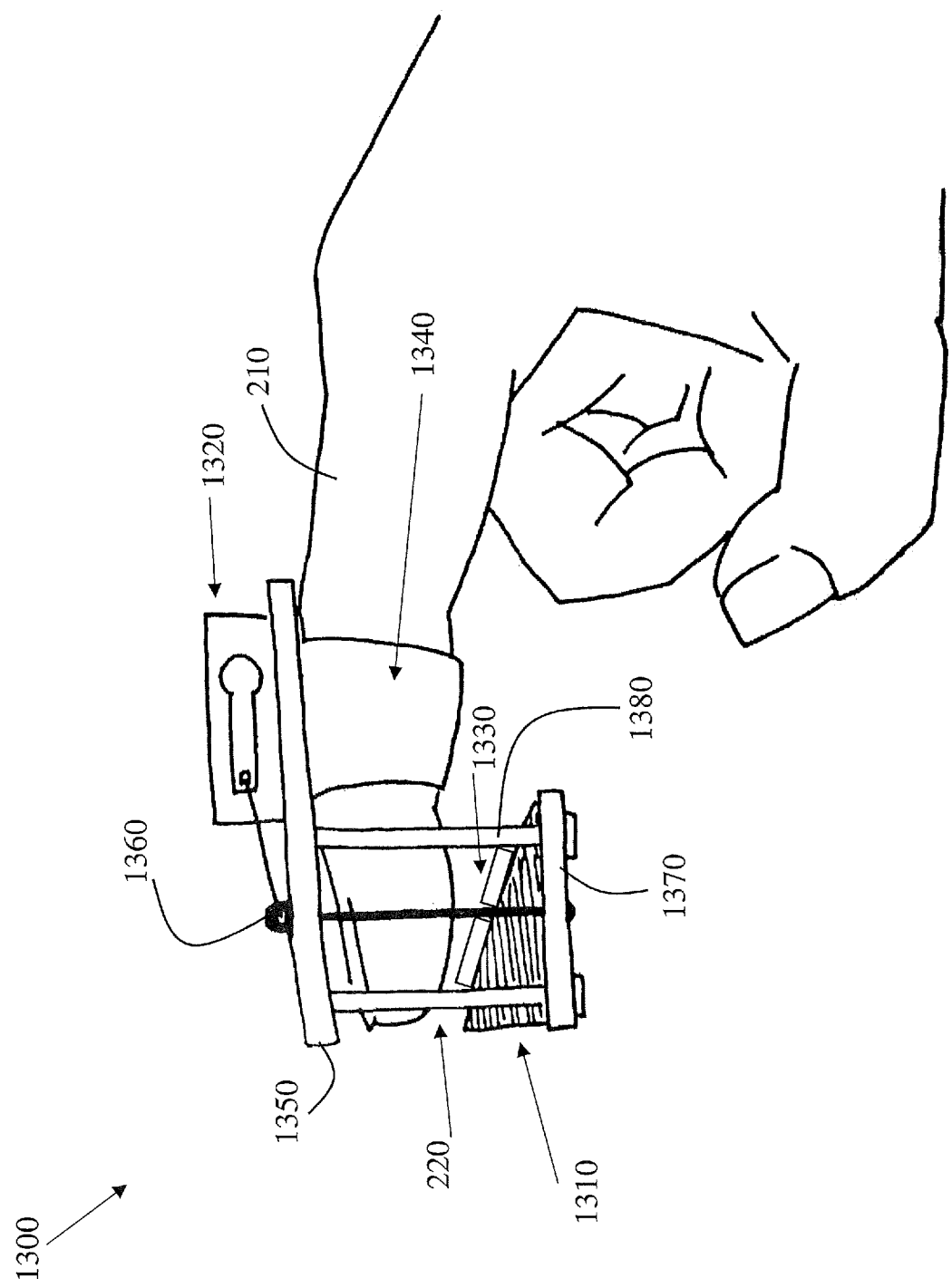

FIG. 12 shows an additional embodiment depicting a dual actuator thimble 1300 that mounts the (high power) actuator 1320 above finger 210, with a fastener 1340. In this embodiment, actuator 1310 includes a relatively low-power actuator for producing finer contact sensations (e.g., texture vibrations), while actuator 1320 includes a relatively higher-power actuator for producing the contact movement and pressure of a platform 1330. A fastener 1340 can be used to fasten the thimble 1300 to finger 210. This configuration may have some similarities with thimble 1200 in FIG. 11

In some cases, thimble 1300 can include an actuator 1320 (such as a miniature hobby servo) that is coupled (e.g., via a connector such as a wire or line) with a lever arm 1360. Actuator 1320 can be configured to rotate the lever arm 1360 to pull a line (e.g., metal cable) passing through housing 1350, coupled with a lower housing member 1370. Lower housing member 1370 can support actuator 1310 and (contact) platform 1330. In some cases, lower housing member 1370 can slide along support members 1380 (e.g., bolts, pins, or other shafts) to move platform 1330 into contact with fingertip 220. In some cases, springs around support members 1380 can push lower housing member 1370 back down when actuator 1320 rotates back to its starting position. In various embodiments, actuator 1310 is mounted over lower housing member 1370 (and below contact platform 1330 for delivering high-bandwidth vibrations to the user's fingertip 220, as discussed herein.

Figure 13:
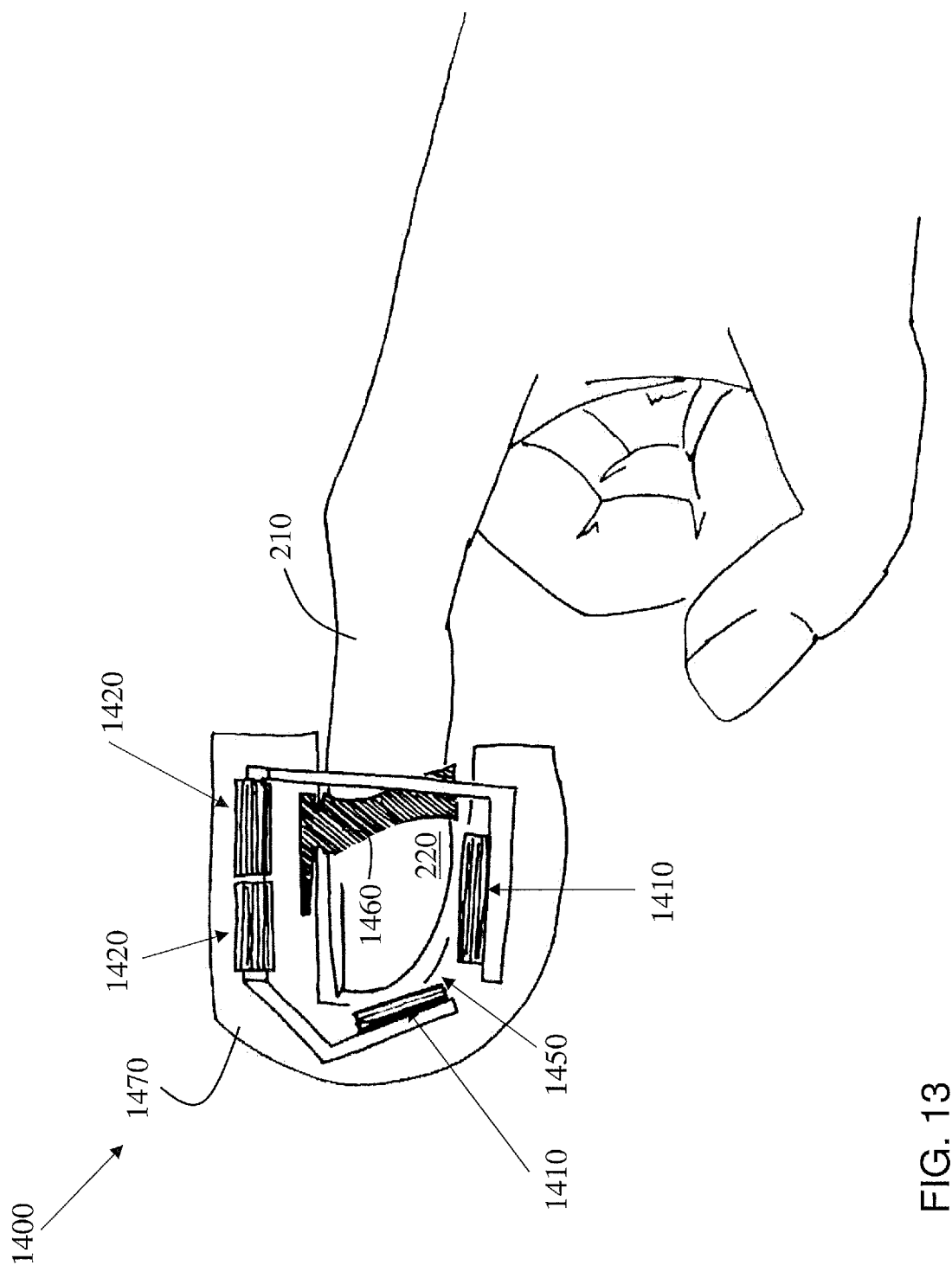

FIG. 13 shows another example embodiment of a thimble 1400, including two distinct contact actuators 1410 located below and adjacent the fingertip 220, for producing finer contact sensations (e.g., texture vibrations) and two additional actuators 1440 located above the finger 210 (along nail-side) for producing contact and contact break movement of platform 1450. In this case, contact platform 1450 can include a plurality of surfaces configured to contact fingertip 210, e.g., at any location of fingertip 210 described herein. In this embodiment, thimble 1400 can be held on finger 210 with fastener 1460, which can be contained within housing 1470. In various embodiments, fastener 1460 can include attachment mechanisms 200, 200A, as described according to various additional embodiments herein.

Figure 15:
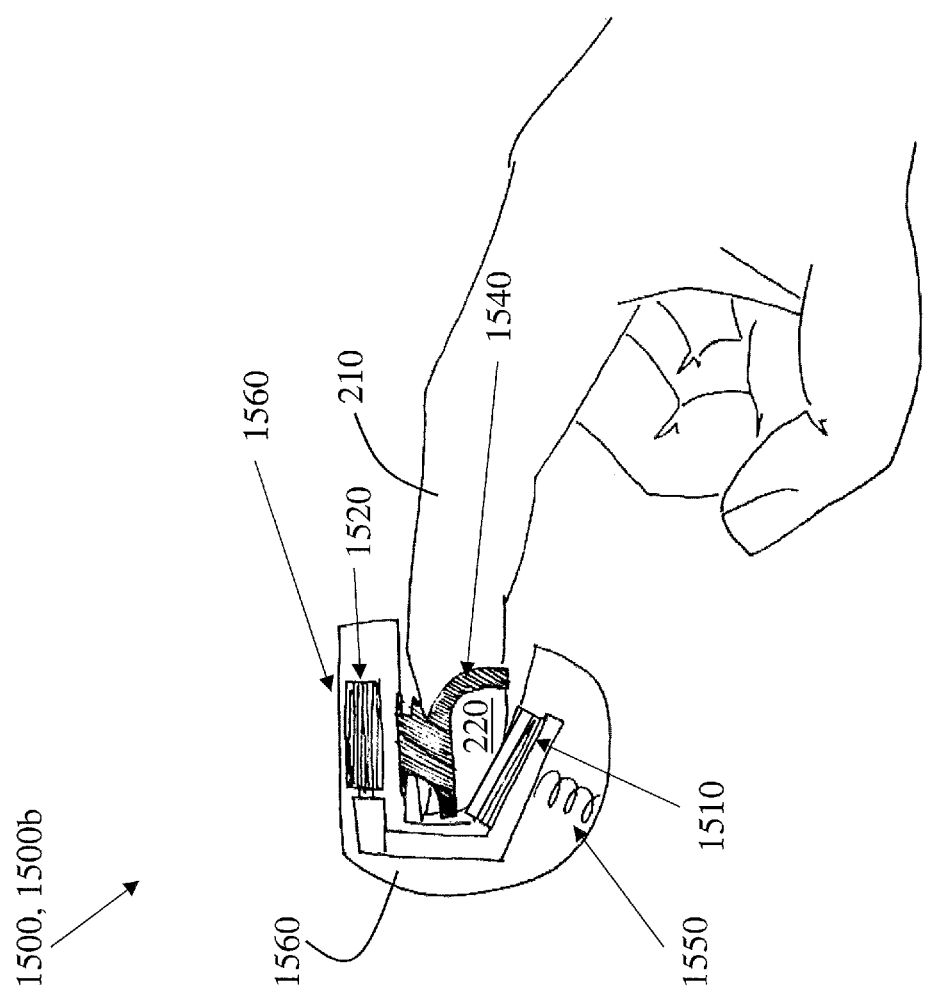

FIGS. 14 and 15 show another embodiment of a thimble 1500, in positions (a) and (b), according to various embodiments of the disclosure. In this embodiment, thimble 1500 includes a housing 1560 including an actuator 1520 above the finger 210 (e.g., an actuator for making/breaking contact with fingertip 220), as well as another actuator 1510 for causing vibrations of platform 1530 with fingertip 220. Thimble 1500 can be coupled with finger 210 using a fastener 1540, which may include attachment mechanisms 200, 200A, as described according to various additional embodiments herein. FIG. 15 shows the platform 1530 in contact with fingertip 220, while FIG. 14 shows platform 1540 separated from fingertip 220. In various embodiments, a spring 1550 is used to aid in displacement of platform 1530. Because the servo is geared, thimble 1500 can achieve higher steady-state forces than a single-actuator design and may consume less power. With actuator 1510, the quality of the vibrations at the fingertip may be comparable to those delivered by the single-actuator device. Because the servo lays flat on the back of the finger, this design has a lower profile than was possible with any of the other designs.

As described herein, it may be beneficial for the contact along the back of the finger to be cushioned with a thin sheet of soft material, such as rubber, to distribute the pressure, or to have it carefully contoured to match the shape of the user's finger. Uncomfortable surface contact can create high-pressure points on the back of the finger; these sensations can be uncomfortable and can distract from the feeling of the platform on the fingertip 220.

In some cases, where temperature feedback is utilized, a thermal feedback element could be placed above the finger or on the edge of the platform, around the vibration actuator. A possible alternative is use a different vibration actuator that does not need to be in contact with the skin, such as an ALPS ForceReactor.

In some cases, where it is useful to know a contact angle between the platform and the fingertip 220, VR system 126, along with thimble(s) 140, 1000, 1100, 1200, 1300, 1400, 1500 perform a calibration routine to adjust the platform position slowly and ask the user to report the instant at which fingertip contact begins. This calibration process could also be addressed with a thin force sensor, such as a force-sensing resistor (FSR) on the surface of the platform. The force sensor could be queried during the calibration routine, or it could be used during the delivery of haptic cues to achieve force output rather than position output. Another approach can include detecting fingertip contact through electrical conductivity by placing two electrical conductors on the contact surface and monitoring the resistance between the exposed extremities. A drop in resistance between the two electrodes indicates contact with the finger. In some cases, thimbles 140, 1000, 1100, 1200, 1300, 1400, 1500 described herein include a platform control approach including a combination of position control, in order to allow the user to feel light touches as well as temperature radiation from close proximity, and force control during contact in order to better handle different finger sizes and hardness. The calibration approach can also take into account the mechanical properties of the current user's fingertip, such as stiffness and damping. Knowing and accounting for the user's fingertip characteristics may allow more consistent presentation of tactile sensations across users. The calibration mechanisms may measure the mechanical properties of the user's fingertip and adjust the tactile output so that feedback is constant across users.

Additional embodiments could also include a custom vibration actuator (e.g., fine movement actuators described with respect to thimble(s) 140, 1000, 1100, 1200, 1300, 1400, 1500). Features of the texture (vibration) actuator can include the ability to produce temperature cues, lateral movement to convey texture, and a frequency range within human fingertip sensation capabilities.

In the description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

We claim:

1. A wearable haptic thimble for use with a virtual reality system, comprising:
   a housing having a slot;
   an attachment mechanism for engaging a finger of a user and the slot in the housing,
   wherein the attachment mechanism is sized to rest on the finger of the user and is sized to substantially surround a portion of the finger of the user,
   wherein the attachment mechanism includes a tab sized to engage the slot in the housing;
   at least one contact pad within the housing, the at least one contact pad configured to move relative to the finger of the user to provide a tactile representation of virtual reality in the virtual reality system;
   wherein the attachment mechanism includes a sleeve coupled with the tab, wherein the sleeve includes: at least one opening permitting access to the tip of the finger; and at least one retaining member for maintaining a position of the portion of the finger within the sleeve relative to the tab, wherein the opening allows the contact pad to contact the tip of the finger to provide the tactile representation;
   a sensor coupled with the housing, the sensor for sensing at least one of a position or an orientation of the wearable haptic thimble; and
   at least one computing device coupled with the sensor and the at least one contact pad,
   wherein the at least one computing device instructs the at least one contact pad to move relative to the finger of the user and relative to the housing in response to the at least one of the position or the orientation of the wearable haptic thimble indicating the finger of the user is contacting a virtual object in virtual reality.

2. The wearable haptic thimble of claim 1, wherein the at least one contact pad consists of a single contact pad.

3. The wearable haptic thimble of claim 1, wherein the contacting includes at least one of approaching or releasing the virtual object.

4. The wearable haptic thimble of claim 1, wherein the tactile representation of virtual reality includes a tactile representation of a virtual object.

5. The wearable haptic thimble of claim 4, wherein the at least one contact pad is configured to vibrate to provide the tactile representation of a texture of the virtual object.

6. The wearable haptic thimble of claim 4, wherein the virtual object represents a real-world object with a set of expected tactile qualities, and wherein the tactile representation provides at least one of the set of expected tactile qualities.

7. The wearable haptic thimble of claim 6, wherein the set of expected tactile qualities includes at least one of: softness, hardness, roughness, friction, texture, or temperature.

8. A wearable haptic thimble for use with an augmented reality system, comprising:
   a housing having a slot;
   an attachment mechanism for engaging a finger of a user and the slot in the housing,
   wherein the attachment mechanism is sized to rest on the finger of the user and is sized to substantially surround a portion of the finger of the user,
   wherein the attachment mechanism includes a tab sized to engage the slot in the housing;
   at least one contact pad within the housing, the at least one contact pad configured to move relative to the finger of the user to provide a tactile representation of augmented reality in the augmented reality system;
   wherein the attachment mechanism includes a sleeve coupled with the tab, wherein the sleeve includes: at least one opening permitting access to the tip of the finger; and at least one retaining member for maintaining a position of the portion of the finger within the sleeve relative to the tab, wherein the opening allows the contact pad to contact the tip of the finger to provide the tactile representation;
   a sensor coupled with the housing, the sensor for sensing at least one of a position or an orientation of the wearable haptic thimble; and
   at least one computing device coupled with the sensor and the at least one contact pad,
   wherein the at least one computing device instructs the at least one contact pad to move relative to the finger of the user and relative to the housing in response to the at least one of the position or the orientation of the wearable haptic thimble indicating the finger of the user is contacting a virtual object in augmented reality.

9. The wearable haptic thimble of claim 8, wherein the at least one contact pad consists of a single contact pad.

10. The wearable haptic thimble of claim 8, wherein the contacting includes at least one of approaching or releasing the virtual object.

11. The wearable haptic thimble of claim 8, wherein the tactile representation of augmented reality includes a tactile representation of an object in the augmented reality system.

12. The wearable haptic thimble of claim 11, wherein the at least one contact pad is configured to vibrate to provide the tactile representation of a texture of the object.

13. The wearable haptic thimble of claim 1, wherein the at least one contact pad is positioned to contact a tip of the finger of the user while moving relative to the finger and relative to the housing.

14. The wearable haptic thimble of claim 1, further comprising at least one actuator coupled with the at least one contact pad for moving the at least one contact pad relative to the finger and relative to the housing.

15. The wearable haptic thimble of claim 8, wherein the at least one contact pad is positioned to contact a tip of the finger of the user while moving relative to the finger and relative to the housing.

16. The wearable haptic thimble of claim 8, further comprising at least one actuator coupled with the at least one contact pad for moving the at least one contact pad relative to the finger and relative to the housing.

17. The wearable haptic thimble of claim 1, wherein the tab is positioned on the nail-side of the finger of the user such that the attachment mechanism helps to suspend the finger of the user within the housing, wherein the attachment mechanism is one of a set of distinct attachment mechanisms each sized to substantially surround a portion of the finger of a user, wherein the distinct attachment mechanisms are sized to engage fingers of different sizes and wherein the tab in each distinct attachment mechanism is sized to engage the slot in the housing.

18. The wearable haptic thimble of claim 17, wherein the tab includes a protrusion sized to substantially fill the slot in the housing.

19. The wearable haptic thimble of claim 8, wherein the tab is positioned on the nail-side of the finger of the user such that the attachment mechanism helps to suspend the finger of the user within the housing, wherein the attachment mechanism is one of a set of distinct attachment mechanisms each sized to substantially surround a portion of the finger of a user, wherein the distinct attachment mechanisms are sized to engage fingers of different sizes and wherein the tab in each distinct attachment mechanism is sized to engage the slot in the housing.

20. The wearable haptic thimble of claim 19, wherein the tab includes a protrusion sized to substantially fill the slot in the housing.

* * * * *